(12) United States Patent
Liu et al.

(10) Patent No.: US 12,156,147 B2
(45) Date of Patent: *Nov. 26, 2024

(54) COMMUNICATION METHOD AND COMMUNICATIONS APPARATUS

(71) Applicant: HUAWEI TECHNOLOGIES CO., LTD., Guangdong (CN)

(72) Inventors: Yong Liu, Shanghai (CN); Xiang Ren, Boulogne Billancourt (FR); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/335,683

(22) Filed: Jun. 15, 2023

(65) Prior Publication Data

US 2023/0328661 A1 Oct. 12, 2023

Related U.S. Application Data

(63) Continuation of application No. 17/569,262, filed on Jan. 5, 2022, now Pat. No. 11,722,968, which is a (Continued)

(30) Foreign Application Priority Data

May 11, 2018 (CN) .......................... 201810451399.3

(51) Int. Cl.
*H04W 52/18* (2009.01)
*H04W 52/14* (2009.01)
*H04W 52/32* (2009.01)

(52) U.S. Cl.
CPC ....... *H04W 52/325* (2013.01); *H04W 52/146* (2013.01)

(58) Field of Classification Search
CPC .......................... H04W 52/325; H04W 52/146
See application file for complete search history.

(56) References Cited

U.S. PATENT DOCUMENTS 9,450,695 B2 9/2016 Zhu et al.
9,622,170 B2 4/2017 Zhu et al.
(Continued)

FOREIGN PATENT DOCUMENTS

CN 102223722 10/2011
CN 102958148 3/2013
(Continued)

OTHER PUBLICATIONS

3GPP TS 36.213 V15.1.0 (Mar. 2018), "3rd Generation Partnership Project; Technical Specification Group Radio Access Network; Evolved Universal Terrestrial Radio Access (E-UTRA); Physical layer procedures (Release 15)," Mar. 2018, 501 pages.
(Continued)

*Primary Examiner* — Hai V Nguyen
(74) *Attorney, Agent, or Firm* — Fish & Richardson P.C.

(57) ABSTRACT

Example communication methods and communications apparatus are described. One example method includes determining power of a demodulation reference signal (DMRS) by a terminal device. The terminal device sends the DMRS based on the determined power. In embodiments of this application, the power of the DMRS can be flexibly determined for different communication statuses.

32 Claims, 7 Drawing Sheets

Related U.S. Application Data continuation of application No. 16/951,566, filed on Nov. 18, 2020, now Pat. No. 11,323,968, which is a continuation of application No. 16/725,442, filed on Dec. 23, 2019, now Pat. No. 10,873,914, which is a continuation of application No. PCT/CN2019/085601, filed on May 6, 2019.

(56) References Cited

U.S. PATENT DOCUMENTS

| | | | |
|---|---|---|---|
| 9,832,737 | B2 | 11/2017 | Ouchi et al. |
| 10,165,517 | B2 | 12/2018 | Sun et al. |
| 10,321,411 | B2 | 6/2019 | Ouchi et al. |
| 10,506,588 | B2 | 12/2019 | Kim et al. |
| 10,594,382 | B2 | 3/2020 | Zhang et al. |
| 10,608,800 | B2 | 3/2020 | Ko et al. |
| 10,608,801 | B2 | 3/2020 | Ko et al. |
| 10,638,477 | B2 | 4/2020 | Kim et al. |
| 10,652,829 | B2 | 5/2020 | Zhang et al. |
| 10,681,722 | B2 | 6/2020 | Maaref et al. |
| 10,708,935 | B2 | 7/2020 | Yang et al. |
| 10,827,508 | B2 | 11/2020 | Cirik et al. |
| 10,856,280 | B2 | 12/2020 | Noh et al. |
| 10,856,315 | B2 | 12/2020 | Yang et al. |
| 10,856,320 | B2 | 12/2020 | Jung et al. |
| 10,873,911 | B2 | 12/2020 | Dinan et al. |
| 10,873,914 | B2* | 12/2020 | Liu ................. H04W 52/32 |
| 10,924,234 | B2 | 2/2021 | Yamamoto et al. |
| 10,925,077 | B2 | 2/2021 | Yang et al. |
| 10,952,255 | B2 | 3/2021 | Loehr et al. |
| 11,006,445 | B2* | 5/2021 | Zhou ................. H04L 5/0048 |
| 11,019,518 | B2 | 5/2021 | Babaei et al. |
| 11,039,350 | B2 | 6/2021 | Cirik et al. |
| 11,051,330 | B2 | 6/2021 | Maaref et al. |
| 11,071,086 | B2 | 7/2021 | Park et al. |
| 11,166,234 | B2* | 11/2021 | Zhou ................. H04W 52/0219 |
| 11,323,968 | B2* | 5/2022 | Liu ................. H04L 27/261 |
| 11,722,968 | B2* | 8/2023 | Liu ................. H04W 52/146 |
| | | | 455/522 |
| 2013/0182664 | A1 | 7/2013 | Chen et al. |
| 2014/0126438 | A1 | 5/2014 | Zhu et al. |
| 2014/0128078 | A1 | 5/2014 | Zhu et al. |
| 2015/0189629 | A1 | 7/2015 | Seo et al. |
| 2015/0271006 | A1 | 9/2015 | Han et al. |
| 2017/0245220 | A1 | 8/2017 | Ouchi et al. |
| 2017/0310447 | A1 | 10/2017 | Kusashima et al. |
| 2018/0270799 | A1 | 9/2018 | Noh et al. |
| 2018/0270894 | A1 | 9/2018 | Park et al. |
| 2018/0279229 | A1* | 9/2018 | Dinan ................. H04W 52/281 |
| 2019/0020455 | A1 | 1/2019 | Yamamoto et al. |
| 2019/0074882 | A1 | 3/2019 | Zhou et al. |
| 2019/0075563 | A1 | 3/2019 | Babaei et al. |
| 2019/0089498 | A1 | 3/2019 | Pelletier et al. |
| 2019/0140729 | A1 | 5/2019 | Zhang et al. |
| 2019/0140801 | A1 | 5/2019 | Ko et al. |
| 2019/0150097 | A1 | 5/2019 | Seo et al. |
| 2019/0159203 | A1 | 5/2019 | Kim et al. |
| 2019/0165914 | A1 | 5/2019 | Chen et al. |
| 2019/0174554 | A1 | 6/2019 | Deenoo et al. |
| 2019/0199477 | A1* | 6/2019 | Park ................. H04L 1/0026 |
| 2019/0215870 | A1 | 7/2019 | Babaei et al. |
| 2019/0238294 | A1 | 8/2019 | Ko et al. |
| 2019/0246421 | A1* | 8/2019 | Zhou ................. H04L 5/00 |
| 2019/0254042 | A1* | 8/2019 | Cirik ................. H04L 5/0048 |
| 2019/0261324 | A1 | 8/2019 | Nam et al. |
| 2019/0306765 | A1 | 10/2019 | Cirik et al. |
| 2019/0306801 | A1 | 10/2019 | Zhou et al. |
| 2019/0313437 | A1 | 10/2019 | Jung et al. |
| 2019/0320457 | A1 | 10/2019 | Maaref et al. |
| 2019/0320469 | A1 | 10/2019 | Huang et al. |
| 2019/0327685 | A1 | 10/2019 | Zhao et al. |
| 2019/0342921 | A1 | 11/2019 | Loehr et al. |
| 2019/0349964 | A1 | 11/2019 | Liou |
| 2019/0357211 | A1 | 11/2019 | Kim et al. |
| 2019/0357215 | A1 | 11/2019 | Zhou et al. |
| 2019/0357238 | A1 | 11/2019 | Zhou et al. |
| 2019/0357261 | A1* | 11/2019 | Cirik ................. H04W 76/11 |
| 2019/0357292 | A1* | 11/2019 | Cirik ................. H04L 5/0053 |
| 2020/0015208 | A1 | 1/2020 | Noh et al. |
| 2020/0022161 | A1 | 1/2020 | Yang et al. |
| 2020/0037360 | A1 | 1/2020 | Qian et al. |
| 2020/0053797 | A1* | 2/2020 | Basu Mallick ... H04W 74/0833 |
| 2020/0059867 | A1 | 2/2020 | Haghighat et al. |
| 2020/0068599 | A1 | 2/2020 | Yang et al. |
| 2020/0100248 | A1* | 3/2020 | Kim ................. H04L 5/0092 |
| 2020/0136782 | A1 | 4/2020 | Liu et al. |
| 2020/0137696 | A1* | 4/2020 | Liu ................. H04W 52/14 |
| 2020/0252917 | A1 | 4/2020 | Zhang et al. |
| 2020/0145079 | A1 | 5/2020 | Marinier et al. |
| 2020/0146028 | A1 | 5/2020 | Yang et al. |
| 2020/0153590 | A1 | 5/2020 | Ko et al. |
| 2020/0163025 | A1 | 5/2020 | Osawa |
| 2020/0177358 | A1 | 6/2020 | Liu et al. |
| 2020/0178292 | A1 | 6/2020 | Kim et al. |
| 2020/0186226 | A1 | 6/2020 | Zhang et al. |
| 2020/0204293 | A1* | 6/2020 | Kim ................. H04L 5/0053 |
| 2020/0205082 | A1 | 6/2020 | Chen |
| 2020/0205088 | A1 | 6/2020 | Yang et al. |
| 2020/0205189 | A1 | 6/2020 | Maaref et al. |
| 2020/0213033 | A1 | 7/2020 | Chen |
| 2020/0213049 | A1 | 7/2020 | Kim et al. |
| 2020/0213053 | A1 | 7/2020 | Faxér et al. |
| 2020/0221395 | A1 | 7/2020 | Lee et al. |
| 2020/0221428 | A1 | 7/2020 | Moon et al. |
| 2020/0221429 | A1 | 7/2020 | Li et al. |
| 2020/0221444 | A1 | 7/2020 | Tiirola et al. |
| 2020/0229186 | A1 | 7/2020 | Kim et al. |
| 2020/0252181 | A1 | 8/2020 | Gao et al. |
| 2020/0252191 | A1 | 8/2020 | Tang |
| 2020/0260486 | A1* | 8/2020 | Zhou ................. H04L 1/1835 |
| 2020/0267668 | A1* | 8/2020 | Xu ................. H04W 72/0473 |
| 2020/0305038 | A1 | 9/2020 | Tooher et al. |
| 2020/0351818 | A1 | 11/2020 | Park et al. |
| 2020/0389859 | A1 | 12/2020 | Lee et al. |
| 2021/0050933 | A1 | 2/2021 | Myung et al. |
| 2021/0051671 | A1 | 2/2021 | Myung et al. |
| 2021/0051672 | A1 | 2/2021 | Rastegardoost et al. |
| 2021/0051707 | A1 | 2/2021 | Rastegardoost et al. |
| 2021/0051710 | A1 | 2/2021 | Cirik et al. |
| 2021/0058950 | A1 | 2/2021 | Yang et al. |
| 2021/0068144 | A1 | 3/2021 | Jung et al. |
| 2021/0100061 | A1 | 4/2021 | Park et al. |
| 2021/0160905 | A1 | 5/2021 | Liou |
| 2021/0168833 | A1 | 6/2021 | Yang et al. |
| 2021/0184824 | A1 | 6/2021 | Kwak et al. |
| 2021/0185609 | A1* | 6/2021 | Zhou ................. H04W 72/21 |
| 2021/0212130 | A1 | 7/2021 | Loehr et al. |
| 2021/0227532 | A1* | 7/2021 | Zhou ................. H04W 72/20 |
| 2021/0243763 | A1* | 8/2021 | Zhou ................. H04L 1/1671 |
| 2021/0243777 | A1 | 8/2021 | Tsai et al. |
| 2021/0298052 | A1* | 9/2021 | Namba ................. H04L 1/1851 |
| 2021/0329608 | A1* | 10/2021 | Bang ................. H04W 72/1268 |
| 2021/0336820 | A1* | 10/2021 | Lim ................. H04W 72/23 |
| 2021/0360594 | A1* | 11/2021 | Park ................. H04B 7/0408 |
| 2021/0360616 | A1* | 11/2021 | Yi ................. H04L 5/0012 |
| 2021/0376985 | A1* | 12/2021 | Zhou ................. H04L 5/0053 |
| 2022/0131643 | A1* | 4/2022 | Park ................. H04L 27/2602 |
| 2023/0309102 | A1* | 9/2023 | Park ................. H04L 5/00 |

FOREIGN PATENT DOCUMENTS

| | | |
|---|---|---|
| CN | 104753647 | 7/2015 |
| CN | 106797652 | 5/2017 |
| CN | 107925968 | 4/2018 |
| EP | 2538575 | 12/2012 |
| EP | 2739102 | 7/2016 |
| EP | 3232598 | 10/2017 |
| JP | 2021503771 | 2/2021 |
| KR | 20180010949 | 1/2018 |
| WO | 2013073909 | 5/2013 |

(56) References Cited

FOREIGN PATENT DOCUMENTS

| WO | 2017196025 | 11/2017 |
|---|---|---|
| WO | 2019099988 | 5/2019 |

OTHER PUBLICATIONS

3GPP TS 38.211 V15.1.0 (Mar. 2018), "3rd Generation Partnership Project; Technical Specification Group Radio Access Network; NR; Physical channels and modulation (Release 15)," Mar. 2018, 90 pages.
3GPP TS 38.212 V15.1.1 (Apr. 2018), "3rd Generation Partnership Project; Technical Specification Group Radio Access Network; NR; Multiplexing and channel coding (Release 15)," Apr. 2018, 94 pages.
3GPP TS 38.214 V15.1.0 (Mar. 2018), "3rd Generation Partnership Project; Technical Specification Group Radio Access Network; NR; Physical layer procedures for data (Release 15)," Chapter 6.2.2, Mar. 2018, 77 pages.
3GPP TS 38.214 V15.1.0 (Mar. 2018), "3rd Generation Partnership Project; Technical Specification Group Radio Access Network; NR; Physical layer procedures for data (Release 15)," Mar. 2018, 77 pages.
3GPP TS 38.331 V15.1.0 (Mar. 2018), "3rd Generation Partnership Project; Technical Specification Group Radio Access Network; NR; Radio Resource Control (RRC) protocol specification (Release 15)," Chapter 6.3, Mar. 2018, 268 pages.
Ericsson et al., "Discussion on DM-RS power boosting," 3GPP TSG-RAN WG1 #60, R1-100849, San Francisco, USA, Feb. 22-26, 2010, 4 pages.
Ericsson, "List of physical layer related RRC parameters for NR," 3GPP TSG RAN WG1 RL1, R1-1719249, Nov. 17, 2017, 99 pages.
Ericsson, "List of RRC parameters for NR," 3GPP TSG RAN WG1_RL1, R1-1721436, Nov. 30, 2017, 156 pages.
Extended European Search Report issued in European Application No. 19800843.5 on Jun. 17, 2020, 10 pages.
Huawei et al., "Remaining issues of PTRS," 3GPP TSG RAN WG1 Meeting #91, R1-1719440, Reno, USA, Nov. 27-Dec. 1, 2017, 9 pages.
Huawei et al., "Signaling of DMRS ports for SU/MU-MIMO," 3GPP TSG RAN WG1 Meeting #90bis, R1-1717310, Prague, Czech Republic, Oct. 9-13, 2017, 15 pages.
Huawei, HiSilicon, "Remaining issues on DMRS design," 3GPP TSG RAN WG1 #93, R1-1805958, Busan, Korea, May 21-25, 2018, 9 pages.
Jian et al., "An Adaptive Algorithm for Uplink Transmission Mode in LTE-A Systems," Study on Optical Communications, No. 193, Feb. 2016, 3 pages (with English abstract).
NEC Group, "Downlink control signalling support for SU/MU-MIMO," 3GPP TSG-RAN WG1 Meeting #59, R1-094730, Jeju, Korea, Nov. 9-13, 2009, 7 pages.
Nokia, Nokia Shanghai Bell, "On remaining issues of DM-RS for NR physical data channels," 3GPP TSG RAN WG1 # 90b, R1-1718516, Prague, Czech Republic, Oct. 9-13, 2017, 12 pages.
NTT Docomo, Inc., "Remaining details on DM-RS," 3GPP TSG RAN WG1 Meeting #92bis, R1-1805045, Sanya, China, Apr. 16-20, 2018, 10 pages.
Office Action in Chinese Appln. No. 201810451399.3, dated Feb. 21, 2023, 6 pages.
Office Action issued in Brazilian Application No. 122020023044-4 on Mar. 29, 2021, 15 pages (with English translation).
Office Action issued in Chinese Application No. 201910556590.9 on Feb. 3, 2020, 7 pages.
Office Action issued in Chinese Application No. 202110589363.3 on Feb. 28, 2022, 5 pages.
Office Action issued in Indian Application No. 201947052946 on Mar. 15, 2021, 6 pages.
Office Action issued in Japanese Application No. 2020-563651 on Aug. 16, 2022, 4 pages (with English translation).
Office Action issued in Japanese Application No. 2020-563651 on Jan. 11, 2022, 9 pages (with English translation).
PCT International Search Report and Written Opinion issued in International Application No. PCT/CN2019/085601 on Jun. 20, 2019, 12 pages (partial English translation).
Qualcomm, "First Summary of Issues for PDSCH/PUSCH's DM-RS," 3GPP TSG RAN WG1 Meeting #92bis, R1-1805611, Sanya, China, Apr. 16-20, 2018, 18 pages.
Spreadtrum Communications, "Remaining issues on DMRS," 3GPP TSG RAN WG1 # 91, R1-1719692, Nov. 27-Dec. 1, 2017, 8 pages.
Vivo, "Remaining issues on DMRS," 3GPP TSG RAN WG1 Meeting #92bis, R1-1803823, Sanya, China, Apr. 16-20, 2018, 7 pages.

* cited by examiner

COMMUNICATION METHOD AND COMMUNICATIONS APPARATUS

CROSS-REFERENCE TO RELATED APPLICATIONS

This application is a continuation of U.S. patent application Ser. No. 17/569,262, filed on Jan. 5, 2022, which is a continuation of U.S. patent application Ser. No. 16/951,566, filed on Nov. 18, 2020, now U.S. Pat. No. 11,323,968, which is a continuation of U.S. patent application Ser. No. 16/725,442, filed on Dec. 23, 2019, now U.S. Pat. No. 10,873,914, which is a continuation of International Application No. PCT/CN2019/085601, filed on May 6, 2019, which claims priority to Chinese Patent Application No. 201810451399.3, filed on May 11, 2018. All of the afore-mentioned patent applications are hereby incorporated by reference in their entireties.

TECHNICAL FIELD

This application relates to the communications field, and in particular, to a communication method and a communications apparatus.

BACKGROUND

In an existing communications system, during transmission of data, a transmit end (such as a terminal device during uplink transmission, or a network device during downlink transmission) needs to send a demodulation reference signal (DMRS), so that a receive end (such as the network device during the uplink transmission, or the terminal device during the downlink transmission) demodulates the data based on the DMRS.

To improve communication performance, in new radio (NR), power compensation needs to be performed on power of the DMRS, and both the receive end and the transmit end need to learn of a power compensation value of the DMRS. Specifically, the transmit end needs to determine, based on the power compensation value, power after the compensation, to send the DMRS, and the receive end needs to determine, based on the power compensation value of the DMRS, the power after the compensation, to perform accurate channel estimation to demodulate the data.

However, power compensation requirements in different communication statuses may be different. Therefore, a single power compensation solution stipulated in current NR cannot satisfy the requirements.

SUMMARY

This application provides a communication method and a communications apparatus, to flexibly determine power of a DMRS for different communication statuses.

According to a first aspect, a demodulation reference signal DMRS sending method is provided. The method includes: determining, by a terminal device, power of a DMRS; and sending, by the terminal device, the DMRS based on the determined power.

According to a second aspect, a demodulation reference signal DMRS receiving method is provided. The method includes: determining, by a network device, power of a DMRS; and receiving, by the network device, the DMRS based on the determined power.

In embodiments of this application, the power of the DMRS can be flexibly determined for the different communication statuses. A problem of a single power compensation solution stipulated in current NR can be resolved, and requirements in the different communication statuses can be satisfied.

With reference to the first aspect or the second aspect, in an implementation, the power of the DMRS is regular power when an uplink scheduling command associated with the DMRS is downlink control information DCI whose format is 0_0, an uplink transmission waveform is cyclic prefix-orthogonal frequency division multiplexing CP-OFDM, and a quantity of symbols occupied in uplink transmission is less than or equal to 2.

With reference to the first aspect or the second aspect, in an implementation, the power of the DMRS is regular power when the terminal device does not establish a radio resource control RRC connection, the uplink transmission waveform is the cyclic prefix-orthogonal frequency division multiplexing CP-OFDM, and the quantity of symbols occupied in the uplink transmission is less than or equal to 2.

With reference to the first aspect or the second aspect, in an implementation, the power of the DMRS is regular power+3 dB when the uplink scheduling command associated with the DMRS is the DCI whose format is 0_0, the uplink transmission waveform is the CP-OFDM, and the quantity of symbols occupied in the uplink transmission is greater than 2.

With reference to the first aspect or the second aspect, in an implementation, the power of the DMRS is regular power+3 dB when the terminal device does not establish the RRC connection, the uplink transmission waveform is the CP-OFDM, and the quantity of symbols occupied in the uplink transmission is greater than 2.

With reference to the first aspect or the second aspect, in an implementation, the power of the DMRS is regular power+3 dB when the uplink scheduling command associated with the DMRS is the DCI whose format is 0_0 and the uplink transmission waveform is discrete Fourier transform-spread spectrum orthogonal frequency division multiplexing DFT-s-OFDM.

With reference to the first aspect or the second aspect, in an implementation, the power of the DMRS is regular power+3 dB when the terminal device does not establish the RRC connection and the uplink transmission waveform is the discrete Fourier transform-spread spectrum orthogonal frequency division multiplexing multiple access DFT-s-OFDM.

With reference to the first aspect or the second aspect, in an implementation, the power of the DMRS is regular power when the uplink scheduling command associated with the DMRS is DCI, cyclic redundancy check CRC of the DCI is scrambled by using a temporary configure radio network temporary identity TC-RNTI, the uplink transmission waveform is the cyclic prefix-orthogonal frequency division multiplexing CP-OFDM, and the quantity of symbols occupied in the uplink transmission is less than or equal to 2.

With reference to the first aspect or the second aspect, in an implementation, the power of the DMRS is regular power+3 dB when the uplink scheduling command associated with the DMRS is the DCI, the CRC of the DCI is scrambled by using the TC-RNTI, the uplink transmission waveform is the CP-OFDM, and the quantity of symbols occupied in the uplink transmission is greater than 2.

With reference to the first aspect or the second aspect, in an implementation, the power of the DMRS is regular power+3 dB when the uplink scheduling command associated with the DMRS is the DCI, the CRC of the DCI is scrambled by using the TC-RNTI, and the uplink transmission waveform is the DFT-s-OFDM.

It should be understood that, the uplink scheduling command is usually a command used for scheduling uplink data transmission. During the uplink data transmission, usually a corresponding DMRS also needs to be transmitted, so that the network device demodulates, based on the DMRS, data transmitted in a process of the uplink data transmission. Therefore, the uplink scheduling command associated with the DMRS may be understood as an uplink scheduling command that schedules the uplink data transmission during which the demodulation is performed based on the DMRS. In a specific implementation process, the uplink scheduling command may be DCI. Usually, the DCI includes a cyclic redundancy check (CRC) field, and the CRC field is scrambled based on a radio network temporary identity (RNTI) of a receiver device (such as the terminal device) of the DCI. In this way, the receiver device may perform blind detection based on the CRC in the DCI, to determine the DCI sent to the receiver device. Content related to the DCI and the CRC of the DCI has been clearly described in the prior art, and details are not described herein again. Usually, RNTIs may be specifically classified into a plurality of types, for example, but not limited to, a temporary configure RNTI (TC-RNTI) and a cell RNTI (C-RNTI). In addition, the quantity of symbols in the uplink transmission may be a quantity of OFDM symbols occupied during the uplink data transmission, that is, a quantity of OFDM symbols on which uplink data is distributed, or usually may be understood as a quantity of OFDM symbols occupied by a PUSCH.

It should be understood that, in the embodiments of this application, the foregoing provides an example in which the format of the DCI of the uplink scheduling command associated with the DMRS is 0_0. However, the embodiments of this application are not limited thereto, provided that the format of the DCI of the uplink scheduling command associated with the DMRS is not 0_1. Therefore, the DCI whose format is 0_0 may be represented as DCI whose format is not 0_1.

It should be understood that, in the embodiments of this application, that the terminal device does not establish the RRC connection may alternatively be represented as that the terminal device does not receive a higher layer configuration (for example, but not limited to, the terminal device does not receive an RRC configuration). The embodiments of this application are not limited thereto.

It should be understood that, in the embodiments of this application, a symbol occupied in the uplink transmission may be a symbol occupied by a physical uplink shared channel (PUSCH).

It should be further understood that, in the embodiments of this application, the regular power may be not a fixed value, but a power value determined by the terminal device based on a usual practice when power boost is not considered.

In other words, when the power of the DMRS is the regular power, a corresponding power boost value is 0 dB. Therefore, for a uniform representation, that the power of the DMRS is the regular power may alternatively be represented as that the power of the DMRS is the regular power+0 dB. When the power of the DMRS is the regular power+3 dB, the corresponding power boost value is 3 dB.

The foregoing provides only an example in which the power boost value is 0 dB or 3 dB, but the embodiments of this application are not limited thereto. During actual application, with evolution of a standard, the power boost value may be another possible value.

According to a third aspect, a demodulation reference signal DMRS receiving method is provided. The method includes: determining, by a terminal device, power of a DMRS; and receiving, by the terminal device, the DMRS based on the determined power.

According to a fourth aspect, a demodulation reference signal DMRS sending method is provided. The method includes: determining, by a network device, power of a DMRS; and sending, by the network device, the DMRS based on the determined power.

With reference to the third aspect or the fourth aspect, in an implementation, the power of the DMRS is regular power when a downlink scheduling command associated with the DMRS is downlink control information DCI whose format is 1_0, a downlink transmission waveform is cyclic prefix-orthogonal frequency division multiplexing CP-OFDM, and a quantity of symbols occupied in downlink transmission is less than or equal to 2.

With reference to the third aspect or the fourth aspect, in an implementation, the power of the DMRS is regular power when the terminal device does not establish a radio resource control RRC connection, the downlink transmission waveform is the cyclic prefix-orthogonal frequency division multiplexing CP-OFDM, and the quantity of symbols occupied in the downlink transmission is less than or equal to 2.

With reference to the third aspect or the fourth aspect, in an implementation, the power of the DMRS is regular power+3 dB when the downlink scheduling command associated with the DMRS is the DCI whose format is 1_0, the downlink transmission waveform is the CP-OFDM, and the quantity of symbols occupied in the downlink transmission is greater than 2.

With reference to the third aspect or the fourth aspect, in an implementation, the power of the DMRS is regular power+3 dB when the terminal device does not establish the RRC connection, the downlink transmission waveform is the CP-OFDM, and the quantity of symbols occupied in the downlink transmission is greater than 2.

With reference to the third aspect or the fourth aspect, in an implementation, the power of the DMRS is regular power when the downlink scheduling command associated with the DMRS is the DCI, cyclic redundancy check CRC of the DCI is scrambled by using a system information radio network temporary identity SI-RNTI, a random access radio network temporary identity RA-RNTI, a paging radio network temporary identity P-RNTI, or a temporary configure radio network temporary identity TC-RNTI, the downlink transmission waveform is the cyclic prefix-orthogonal frequency division multiplexing CP-OFDM, and the quantity of symbols occupied in the downlink transmission is less than or equal to 2.

With reference to the third aspect or the fourth aspect, in an implementation, the power of the DMRS is regular power+3 dB when the downlink scheduling command associated with the DMRS is the DCI, the CRC of the DCI is scrambled by using the SI-RNTI, the RA-RNTI, the P-RNTI, or the TC-RNTI, the downlink transmission waveform is the CP-OFDM, and the quantity of symbols occupied in the downlink transmission is greater than 2.

It should be understood that, the downlink scheduling command is usually a command used for scheduling downlink data transmission. During the downlink data transmission, usually a corresponding DMRS also needs to be transmitted, so that the terminal device demodulates, based on the DMRS, data transmitted in a process of the downlink data transmission. Therefore, the downlink scheduling command associated with the DMRS may be understood as a downlink scheduling command that schedules the downlink data transmission during which the demodulation is performed based on the DMRS. In a specific implementation process, the downlink scheduling command may be DCI. Usually, the DCI includes a CRC field, and the CRC field is scrambled based on an RNTI of a receiver device (such as the terminal device) of the DCI. In this way, the receiver device may perform blind detection based on the CRC in the DCI, to determine the DCI sent to the receiver device. Content related to the DCI and the CRC of the DCI has been clearly described in the prior art, and details are not described herein again. Usually, RNTIs may be specifically classified into a plurality of types, for example, but not limited to, a TC-RNTI, a C-RNTI, a paging RNTI (P-RNTI), a system information RNTI (SI-RNTI), a random access RNTI (RA-RNTI), and a configured scheduled RNTI (CS-RNTI). In addition, the quantity of symbols in the downlink transmission may be a quantity of OFDM symbols occupied during the downlink data transmission, that is, a quantity of OFDM symbols on which downlink data is distributed, or usually may be understood as a quantity of OFDM symbols occupied by a PDSCH.

It should be understood that, in the embodiments of this application, the foregoing provides an example in which the format of the DCI of the downlink scheduling command associated with the DMRS is 1_0. However, the embodiments of this application are not limited thereto, provided that the format of the DCI of the uplink scheduling command associated with the DMRS is not 1_1. Therefore, the DCI whose format is 1_0 may be represented as DCI whose format is not 1_1.

It should be understood that, in the embodiments of this application, that the terminal device does not establish the RRC connection may alternatively be represented as that the terminal device does not receive a higher layer configuration (for example, but not limited to, the terminal device does not receive an RRC configuration). The embodiments of this application are not limited thereto.

It should be understood that, in the embodiments of this application, a symbol occupied in the downlink transmission may be a symbol occupied by a physical downlink shared channel (PDSCH).

It should be further understood that, in the embodiments of this application, the regular power may be not a fixed value, but a power value determined by the terminal device based on a usual practice when power boost is not considered.

In other words, when the power of the DMRS is the regular power, a corresponding power boost value is 0 dB. Therefore, for a uniform representation, that the power of the DMRS is the regular power may alternatively be represented as that the power of the DMRS is the regular power+0 dB. When the power of the DMRS is the regular power+3 dB, the corresponding power boost value is 3 dB.

The foregoing provides only an example in which the power boost value is 0 dB or 3 dB, but the embodiments of this application are not limited thereto. During actual application, with evolvement of a standard, the power boost value may be another possible value.

According to a fifth aspect, a communications apparatus is provided, and includes modules or units configured to perform the method in the first aspect, the third aspect, or any possible implementation in the first aspect or the third aspect.

In an implementation, the communications apparatus is a terminal device.

According to a sixth aspect, a communications apparatus is provided, and includes modules or units configured to perform the method in the second aspect, the fourth aspect, or any possible implementation in the second aspect or the fourth aspect.

In an implementation, the communications apparatus is a network device.

According to a seventh aspect, a communications apparatus is provided, and includes a transceiver, a processor, and a memory. The processor is configured to control the transceiver to receive and send a signal. The memory is configured to store a computer program. The processor is configured to: invoke the computer program from the memory and run the computer program, so that the communications apparatus performs the method in the first aspect, the third aspect, or a possible implementation in the first aspect or the third aspect.

In an implementation, the communications apparatus is a terminal device.

According to an eighth aspect, a communications apparatus is provided, and includes a transceiver, a processor, and a memory. The processor is configured to control the transceiver to receive and send a signal. The memory is configured to store a computer program. The processor is configured to: invoke the computer program from the memory and run the computer program, so that the communications apparatus performs the method in the second aspect, the fourth aspect, or a possible implementation in the second aspect or the fourth aspect.

In an implementation, the communications apparatus is a network device.

According to a ninth aspect, a computer readable medium is provided. A computer program is stored on the computer readable medium. When being executed by a computer, the computer program implements the method in the first aspect, the third aspect, or any possible implementation in the first aspect or the third aspect.

According to a tenth aspect, a computer readable medium is provided. A computer program is stored on the computer readable medium. When being executed by a computer, the computer program implements the method in the second aspect, the fourth aspect, or any possible implementation in the second aspect or the fourth aspect.

According to an eleventh aspect, a computer program product is provided. When being executed by a computer, the computer program product implements the method in the first aspect, the third aspect, or any possible implementation in the first aspect or the third aspect.

According to a twelfth aspect, a computer program product is provided. When being executed by a computer, the computer program product implements the method in the second aspect, the fourth aspect, or any possible implementation in the second aspect or the fourth aspect.

According to a thirteenth aspect, a processing apparatus is provided, and includes a processor.

In an implementation, the method in the first aspect to the fourth aspect or any possible implementation in the first to the fourth aspects is performed by the processor. In this case, the processor may be a dedicated processor.

In another implementation, the processing apparatus may further include a memory. The memory stores code. The processor executes the code in the memory to perform the method in the first aspect to the fourth aspect or any possible implementation in the first to the fourth aspects. In this case, the processor may be a general-purpose processor.

It should be understood that, a related data exchange process, such as DMRS sending, in the thirteenth aspect may be a process of outputting a DMRS from the processor, and DMRS receiving may be a process of receiving an inputted DMRS by the processor. Specifically, the data outputted from the processor may be outputted to a transmitter, and inputted data received by the processor may come from a receiver. The transmitter and the receiver may be collectively referred to as the transceiver.

The processing apparatus in the thirteenth aspect may be a chip. The processor may be implemented by using hardware or may be implemented by using software. When being implemented by using hardware, the processor may be a logic circuit, an integrated circuit, or the like. When being implemented by using software, the processor may be a general-purpose processor, and is implemented by reading the software code stored on the memory. The memory may be integrated in the processor, or may be located outside the processor and independently exist.

According to a fourteenth aspect, a system is provided, and includes the network device and the terminal device described above.

DESCRIPTION OF EMBODIMENTS

Figure 1:
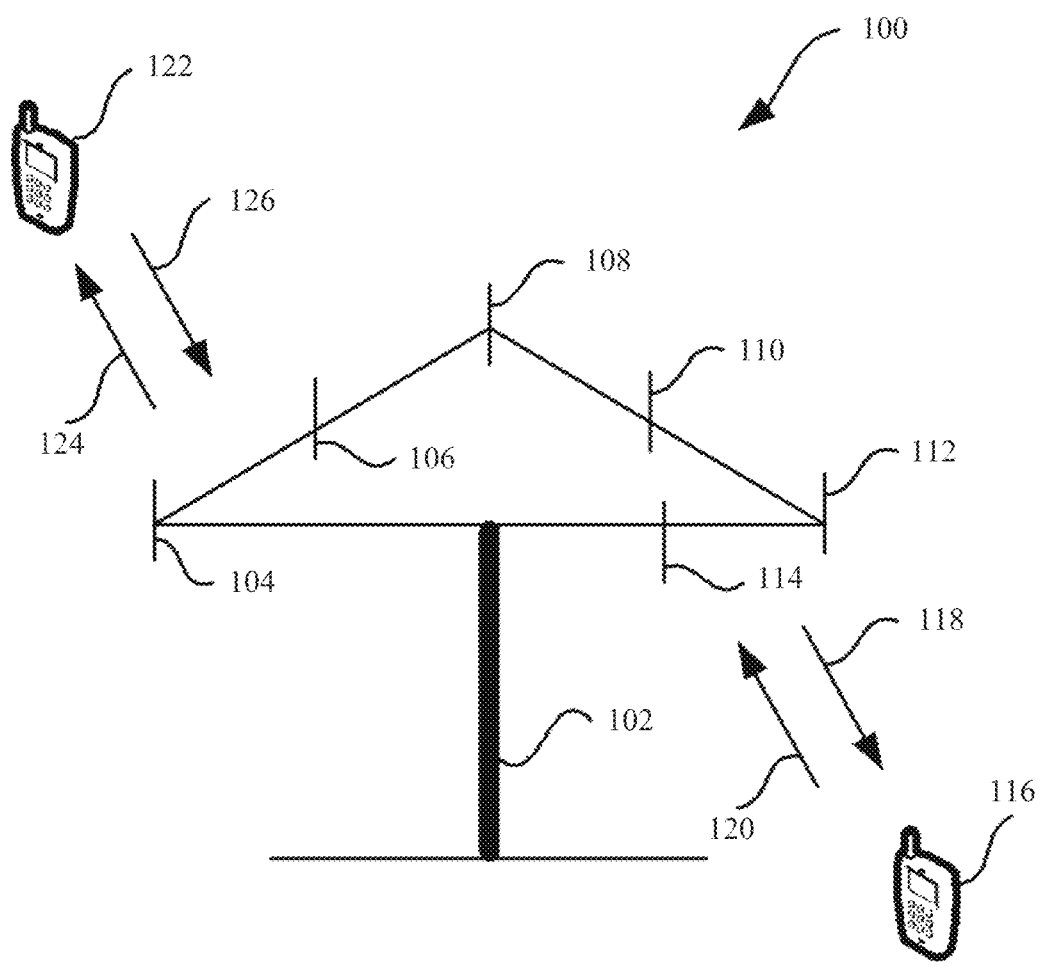
FIG. 1 is a schematic diagram of a scenario of an applicable communications system according to an embodiment of this application.

The following describes technical solutions of this application with reference to accompanying drawings.

Embodiments of this application may be applied to various communications systems. Therefore, the following descriptions are not limited to a particular communications system. A next generation communications system is a 5th generation (5G) communications system, for example, a new radio (NR) system.

In the embodiments of this application, a network device may be a network side device on a future 5G network, for example, a transmission point (TRP or TP) in the NR system, a base station (gNB) in the NR system, a radio unit, such as a remote radio unit, in the NR system, one or one group (including a plurality of antenna panels) of antenna panels of a base station in the 5G system. Different network devices may be located in a same cell, or may be located in different cells. Specifically, this is not limited herein.

In some deployments, the gNB may include a centralized unit (CU) and a distributed unit (DU). The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Because information about the RRC layer is finally changed to information about the PHY layer, or is changed from information about the PHY layer, in this architecture, high layer signaling, such as RRC layer signaling or PDCP layer signaling, may alternatively be considered to be sent by the DU or be sent by the DU and the RU. It may be understood that, the network device may be a CU node, a DU node, or a device including a CU node and a DU node. In addition, the CU may be classified as a network device on an access network RAN, or the CU may be classified as a network device on a core network CN. This is not limited herein.

The terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

As an example but not a limitation, in the embodiments of the present invention, the terminal device may also be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. Generalized wearable intelligent devices include full-featured and large-size devices that can implement complete or partial functions without depending on smartphones, such as smartwatches or smart glasses, and devices that focus on only one type of application and need to work with other devices such as smartphones, such as various smart bands or smart jewelries for vital sign monitoring.

The embodiments of this application may be applicable to any communications system in the foregoing. For example, the embodiments of this application may be applicable to a Long-Term Evolution (LTE) system and a subsequent evolved system, such as 5G, or another wireless communications system using various radio access technologies, such as a system using access technologies such as code division multiple access, frequency division multiple access, time division multiple access, orthogonal frequency division multiple access, and single carrier frequency division multiple access, and in particular, applicable to a scenario that needs channel information feedback and/or to which a second level precoding technology is applied, such as a wireless network to which a massive multiple-input multiple-output (Massive MIMO) technology is applied, or a wireless network to which a distributed antenna technology is applied.

FIG. 1 is a schematic diagram of a scenario of an applicable communications system according to an embodiment of this application. As shown in FIG. 1, the communications system 100 includes a network side device 102, and a plurality of terminal devices (such as a terminal device 116 and a terminal device 122). The network device 102 may provide the terminal device with a communication service and access a core network. The terminal device accesses a network by searching for a synchronization signal, a broadcast signal, or the like sent by the network device, thereby performing communication with the network, for example, performing uplink/downlink transmission.

Specifically, the network side device 102 may include a plurality of antenna groups. Each antenna group may include multiple antennas. For example, one antenna group may include antennas 104 and 106, another antenna group may include antennas 106 and 110, and an additional group may include antennas 112 and 114. For each antenna group, two antennas are shown in FIG. 1. However, more or fewer antennas may be used for each group. The network side device 102 may additionally include a transmitter chain and a receiver chain, and a person of ordinary skill in the art may understand that both the transmitter chain and the receiver chain may include multiple components (for example, a processor, a modulator, a multiplexer, a demodulator, a demultiplexer, and an antenna) related to signal sending and receiving.

The network side device 102 may communicate with the plurality of terminal devices (for example, the terminal device 116 and the terminal device 122). However, it may be understood that the network side device 102 may communicate with any quantity of terminal devices similar to the terminal device 116 or 122.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106, and the antennas 104 and 106 send information to the terminal device 122 over a forward link 124, and receive information from the terminal device 122 over a reverse link 126.

For example, in a frequency division duplex (FDD) system, the forward link 118 may use a frequency band different from a frequency band used by the reverse link 120, and the forward link 124 may use a frequency band different from a frequency band used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each group of antennas and/or each area designed for communication is referred to as a sector of the network side device 102. For example, an antenna group may be designed to communicate with a terminal device in a sector of a coverage area of the network side device 102. When the network side device 102 communicates with the terminal devices 116 and 122 respectively over the forward links 116 and 124, a transmit antenna of the network side device 102 may improve signal-to-noise ratios of the forward links 116 and 124 through beamforming. In addition, compared with a manner in which a network side device sends signals to all terminal devices of the network side device by using one single antenna, when the network side device 102 sends, through beamforming, signals to the terminal devices 116 and 122 that are randomly dispersed in a related coverage area, a mobile device in a neighboring cell suffers less interference.

In a given time, the network side device 102, the terminal device 116, or the terminal device 122 may be a wireless communications sending apparatus and/or a wireless communications receiving apparatus. When sending data, the sending apparatus for wireless communication may encode the data for transmission. Specifically, the sending apparatus for wireless communication may obtain (for example, generate, receive from another communications apparatus, or store in a memory) a particular quantity of data bits to be sent, by using a channel, to the receiving apparatus for wireless communication. The data bit may be included in a transport block (or a plurality of transport blocks) of the data, and the transport block may be segmented to produce a plurality of code blocks.

In addition, the communications system 100 may be a public land mobile network PLMN, a device to device (D2D) network, a machine to machine (M2M) network, or another network. FIG. 1 is only an example of a simplified schematic diagram for ease of understanding. The network may further include another network device that is not drawn in FIG. 1.

During transmission of data, a transmit end (such as a terminal device during uplink transmission, or a network device during downlink transmission) needs to send a demodulation reference signal (DMRS), so that a receive end (such as the network device during the uplink transmission, or the terminal device during the downlink transmission) demodulates the data based on the DMRS.

To implement correct demodulation of the data by the receive end, the receive end and the transmit end need to learn of a same power compensation value. In an existing standard, for a DCI format 0_1 and a DCI format 1_1, the network device may indicate, in a signaling form, a power compensation value of a DMRS.

For example, for the DCI format 0_1 and the DCI format 1_1, the network device may indicate the power compensation value of the DMRS by using a field in DCI, such as an antenna port downlink control information field (Antenna port(s) DCI field).

Specifically, the terminal device may use the antenna port downlink control information field (Antenna port(s) DCI field) in the DCI to learn of a parameter: CDM groups without data, and the terminal device may query Table 1 to learn of the power compensation value of the DMRS. Table 1 may be Table 4.1-1 and Table 6.2.2-1 in the existing 38.214 standard: a ratio of downlink/uplink shared channel energy per resource element to demodulation reference signal energy per resource element (The ratio of PDSCH/PUSCH EPRE to DM-RS EPRE).

TABLE 1

| Quantity of demodulation reference signal code division multiplexing groups without data (Number of DM-RS CDM groups without data) | DMRS configuration type 1 (DM-RS configuration type 1) | DMRS configuration type 2 (DM-RS configuration type 2) |
|---|---|---|
| 1 | 0 dB | 0 dB |
| 2 | −3 dB | −3 dB |
| 3 | — | −4.77 dB |

When the terminal device does not establish an RRC connection, for example, when the terminal device does not receive a higher layer configuration, or the DCI format is 0_0 or 1_0, the transmit end transmits a DMRS by using a default pattern of the DMRS and a fixed port such as a port 0.

Figure 2:
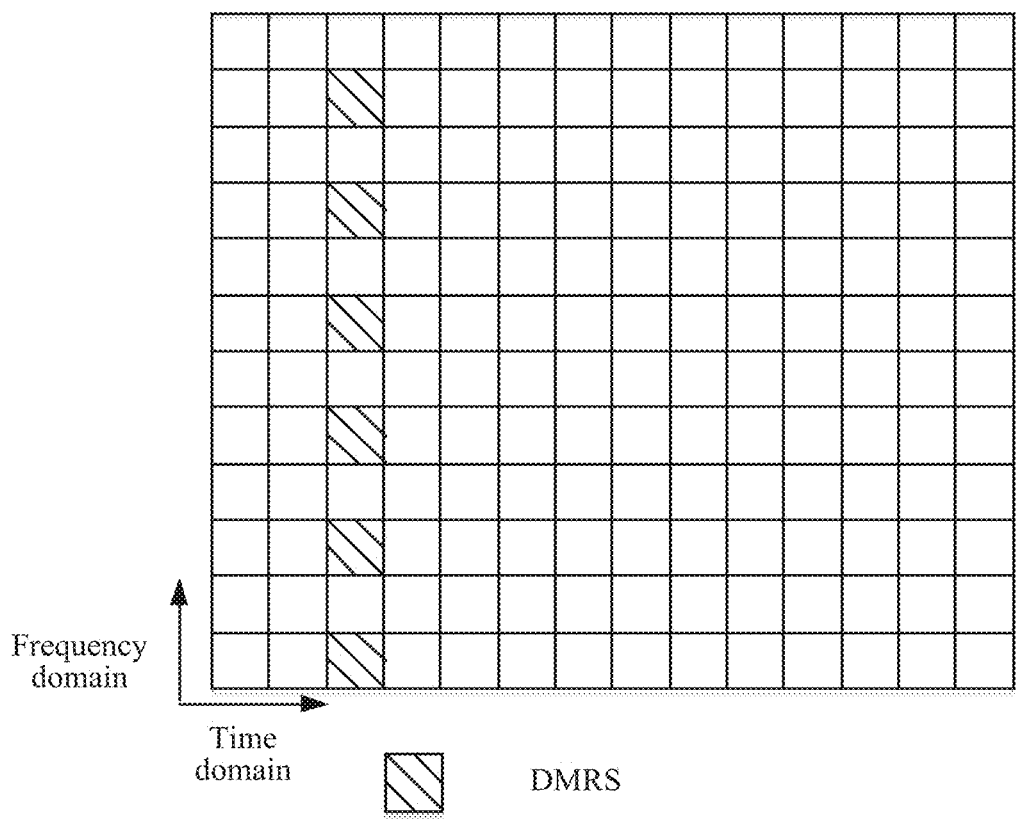
FIG. 2 is a schematic diagram of a pattern of a DMRS.

For example, as an example but not a limitation, when the terminal device does not establish the RRC connection, and is scheduled by a control channel whose DCI format is 0_0 or 1_0, a form of the default pattern used by the transmit end to transmit the DMRS is shown in FIG. 2. Because the port for sending the DMRS is fixed in this case, DCI does not include the antenna port downlink control information field. Consequently the terminal device cannot learn of a specific power compensation value, affecting performance of communication between the receive end and the transmit end.

In view of the foregoing problem, the embodiments of this application provide a specific solution for transmission of the DMRS. As an example but not a limitation, the following describes a process and actions of performing a communication method of this application in the communications system.

Figure 3:
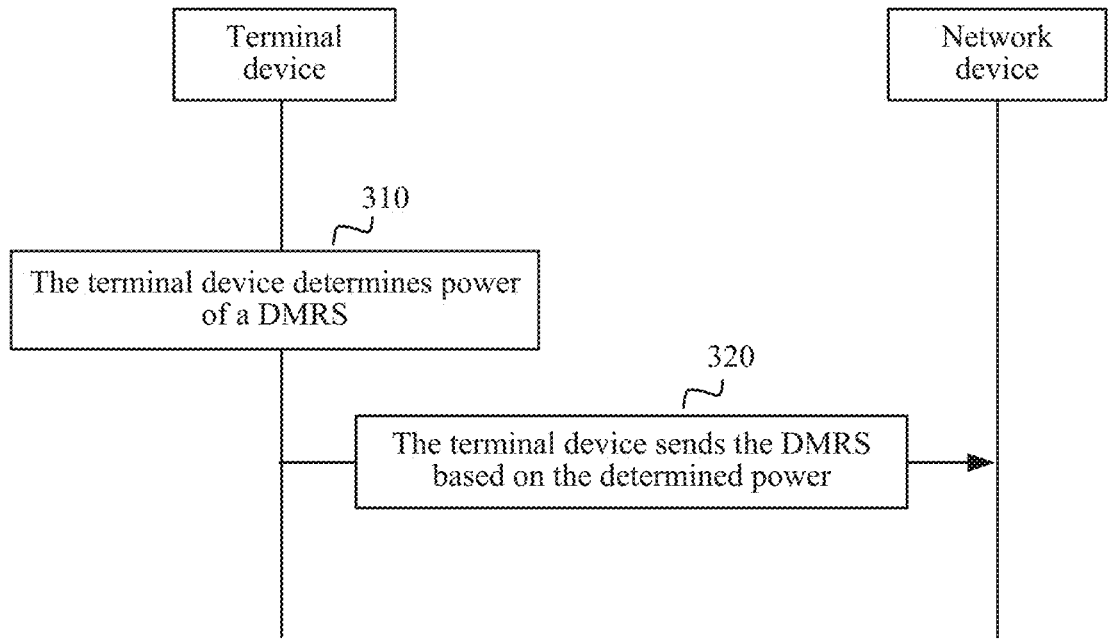
FIG. 3 is a schematic flowchart of a communication method according to this application.
Figure 4:
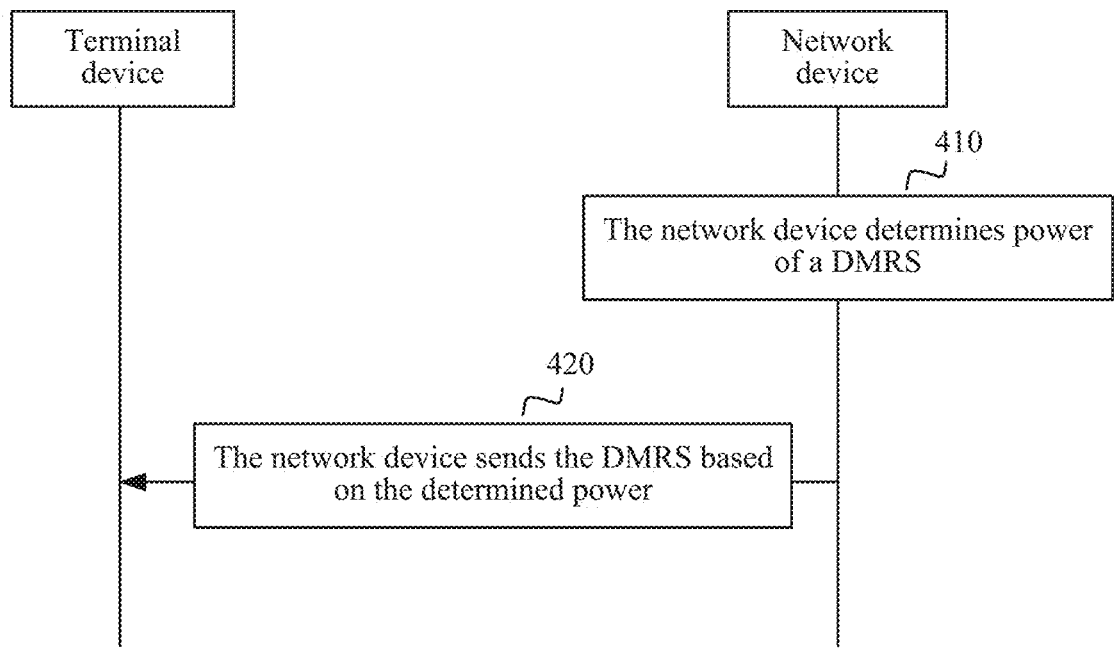
FIG. 4 is a schematic flowchart of another communication method according to this application.

The following describes a solution of uplink transmission according to an embodiment of this application with reference to FIG. 3, and describes a solution of downlink transmission according to an embodiment of this application with reference to FIG. 4.

FIG. 3 describes an uplink transmission method according to an embodiment of this application. The method shown in FIG. 3 is described from a perspective of interaction between a network device and a terminal device. Specifically, the method 300 shown in FIG. 3 includes the following steps.

310: The terminal device determines power of a DMRS.

In a specific implementation process, the terminal device may determine the power of the DMRS by referring to correspondences described in Table 2.

TABLE 2

| DCI format/RRC connection | Waveform | Quantity of symbols in uplink transmission | Power of a DMRS |
|---|---|---|---|
| An uplink scheduling command associated with a DMRS is downlink control information DCI whose format is 0_0. | CP-OFDM | Less than or equal to 2 | Regular power |
| No RRC connection is established. | CP-OFDM | Less than or equal to 2 | Regular power |
| An uplink scheduling command associated with a DMRS is downlink control information DCI whose format is 0_0. | CP-OFDM | Greater than 2 | Regular power + 3 dB |
| No RRC connection is established. An uplink scheduling command associated with a DMRS is downlink control information DCI whose format is 0_0. | CP-OFDM DFT-s-OFDM | Greater than 2 | Regular power + 3 dB Regular power + 3 dB |
| No RRC connection is established. | DFT-s-OFDM | | Regular power + 3 dB |
| An uplink scheduling command associated with a DMRS is DCI, and CRC of the DCI is scrambled by using a TC-RNTI. | CP-OFDM | Less than or equal to 2 | Regular power |
| An uplink scheduling command associated with a DMRS is DCI, and CRC of the DCI is scrambled by using a TC-RNTI. | CP-OFDM | Greater than 2 | Regular power + 3 dB |
| An uplink scheduling command associated with a DMRS is DCI, and CRC of the DCI is scrambled by using a TC-RNTI. | DFT-s-OFDM | | Regular power + 3 dB |

It should be noted that, in a specific implementation process, some correspondences or all correspondences in the foregoing table may be selected based on a specific requirement.

The uplink scheduling command is usually a command used for scheduling uplink data transmission. During the uplink data transmission, usually a corresponding DMRS also needs to be transmitted, so that the network device demodulates, based on the DMRS, data transmitted in a process of the uplink data transmission. Therefore, the uplink scheduling command associated with the DMRS may be understood as an uplink scheduling command that schedules the uplink data transmission during which the demodulation is performed based on the DMRS. In a specific implementation process, the uplink scheduling command may be DCI. Usually, the DCI includes a cyclic redundancy check (CRC) field, and the CRC field is scrambled based on a radio network temporary identity (RNTI) of a receiver device (such as the terminal device) of the DCI. In this way, the receiver device may perform blind detection based on the CRC in the DCI, to determine the DCI sent to the receiver device. Content related to the DCI and the CRC of the DCI has been clearly described in the prior art, and details are not described herein again. Usually, RNTIs may be specifically classified into a plurality of types, for example, but not limited to, a temporary configure RNTI (TC-RNTI) and a cell RNTI (C-RNTI). In addition, the quantity of symbols in the uplink transmission may be a quantity of OFDM symbols occupied during the uplink data transmission, that is, a quantity of OFDM symbols on which uplink data is distributed, or usually may be understood as a quantity of OFDM symbols occupied by a PUSCH.

Specifically, for definitions and functions of the foregoing RNTIs, refer to the prior art, for example, refer to stipulations in LTE. Details are not described herein again.

Actually, each row in Table 2 in the foregoing may be understood as representing a communication status. The first row to the ninth row respectively correspond to a communication status 1 to a communication status 9. It can be learned from this that, the terminal device may determine a current communication status (or referred to as a network status) based on a value of a network parameter, and query Table 2 in the foregoing based on the current communication status, to determine power of the DMRS corresponding to the current communication status.

It should be understood that, in this specification, cases of the nine uplink communication statuses are listed only as an example, and the embodiments of this application may further specifically include another uplink communication status. The embodiments of this application are not limited thereto.

It should be further understood that, a condition of a value of a parameter corresponding to each of the foregoing nine communication statuses is only an example. During actual application, the condition corresponding to each communication status may be increased or decreased in quantity, or conditions in different communication statuses may be mutually merged. The foregoing nine communication statuses may be mutually combined, merged, or nested. The embodiments of this application are not limited thereto.

Specifically, based on the pattern of the DMRS shown in FIG. 2, it can be learned that, only some REs in a symbol corresponding to the DMRS (DMRS symbol for short below) are used for transmitting the DMRS, and the other REs are not used for transmitting the DMRS.

When the current communication status is the communication status 1, the communication status 2, or the communication status 7, because a quantity of symbols occupied in PUSCH transmission is relatively small, and is less than or equal to two, the REs that are not used for transmitting the DMRS and that are in the DMRS symbol may be used for transmitting uplink data, thereby increasing a data transmission amount, to increase a network throughput. In this case, because a signal is transmitted in each RE in the DMRS symbol, the power of the DMRS does not need to be boosted, that is, the power of the DMRS is the regular power.

When the current communication status is the communication status 3, the communication status 4, or the communication status 8, because a quantity of symbols occupied in PUSCH transmission is relatively large, and is greater than two symbols, and an uplink data amount is relatively large in this case, to improve precision of a related estimation, the REs that are not used for transmitting the DMRS and that are in the DMRS symbol may be not used for transmitting uplink data. In this case, a signal is transmitted in each of only some REs in the DMRS symbol. Therefore, to ensure that power on all symbols is equal, the DMRS power needs to be boosted, that is, the power of the DMRS is the regular power+3 dB.

When the current communication status is the communication status 5, the communication status 6, or the communication status 9, to ensure a peak to average power ratio (PAPR) of a signal, the REs that are not used for transmitting the DMRS and that are in the DMRS symbol may be not used for transmitting uplink data. In this case, a signal is transmitted in each of only some REs in the DMRS symbol. Therefore, to ensure that power on all symbols is equal, the DMRS power needs to be boosted, that is, the power of the DMRS is the regular power+3 dB.

It should be understood that, in the embodiments of this application, the foregoing provides an example in which the format of the DCI of the uplink scheduling command associated with the DMRS is 0_0. However, the embodiments of this application are not limited thereto, provided that the format of the DCI of the uplink scheduling command associated with the DMRS is not 0_1. Therefore, the DCI whose format is 0_0 may be represented as DCI whose format is not 0_1.

It should be understood that, in the embodiments of this application, that the terminal device does not establish the RRC connection may alternatively be represented as that the terminal device does not receive a higher layer configuration (for example, but not limited to, the terminal device does not receive an RRC configuration). The embodiments of this application are not limited thereto.

It should be understood that, in the embodiments of this application, a symbol occupied in the uplink transmission may be a symbol occupied by a physical uplink shared channel (PUSCH).

It should be further understood that, in the embodiments of this application, the regular power may be not a fixed value, but a power value determined by the terminal device based on a usual practice when power boost is not considered.

In other words, when the power of the DMRS is the regular power, a corresponding power boost value is 0 dB. Therefore, for a uniform representation, that the power of the DMRS is the regular power may alternatively be represented as that the power of the DMRS is the regular power+0 dB. When the power of the DMRS is the regular power+3 dB, the corresponding power boost value is 3 dB.

The foregoing provides only an example in which the power boost value is 0 dB or 3 dB, but the embodiments of this application are not limited thereto. During actual application, with evolution of a standard, the power boost value may be another possible value.

Based on the foregoing descriptions, it can be educed that, in the embodiments of this application, the nine communication statuses listed in the foregoing each correspond to one piece of power of the DMRS.

In the foregoing implementation, both the network device and the terminal device may directly determine the power of the DMRS based on a value of a network parameter by querying Table 2 in the foregoing.

Alternatively, in another implementation, in the embodiments of this application, the network device and the terminal device may indirectly obtain the power of the DMRS by querying a table.

Specifically, the network device and the terminal device may store correspondences between the values of the plurality of parameters in the foregoing and values of code division multiplexing groups without data (CDM groups without data). For example, the correspondences are shown in Table 3 in the following.

TABLE 3

| DCI format/RRC connection | Waveform | Quantity of symbols in uplink transmission | Number of DM-RS CDM groups without data |
|---|---|---|---|
| An uplink scheduling command associated with a DMRS is downlink control information DCI whose format is 0_0. | CP-OFDM | Less than or equal to 2 | 1 |
| No RRC connection is established. | CP-OFDM | Less than or equal to 2 | 1 |
| An uplink scheduling command associated with a DMRS is downlink control information DCI whose format is 0_0. | CP-OFDM | Greater than 2 | 2 |
| No RRC connection is established. | CP-OFDM | Greater than 2 | 2 |
| An uplink scheduling command associated with a DMRS is downlink control information DCI whose format is 0_0. | DFT-s-OFDM | | 2 |
| No RRC connection is established. | DFT-s-OFDM | | 2 |
| An uplink scheduling command associated with a DMRS is DCI, and CRC of the DCI is scrambled by using a TC-RNTI. | CP-OFDM | Less than or equal to 2 | 1 |
| An uplink scheduling command associated with a DMRS is DCI, and CRC of the DCI is scrambled by using a TC-RNTI. | CP-OFDM | Greater than 2 | 2 |
| An uplink scheduling command associated with a DMRS is DCI, and CRC of the DCI is scrambled by using a TC-RNTI. | DFT-s-OFDM | | 2 |

In a specific implementation process, the terminal device may determine, based on values of the foregoing parameters on a current network, values of code division multiplexing groups without data (CDM groups without data) corresponding to the terminal device, and then query Table 1 based on the values of the code division multiplexing groups without data (CDM groups without data), to determine the power of the DMRS.

Alternatively, in another implementation, in the embodiments of this application, the network device and the terminal device may not need to pre-configure the correspondences in Table 2 or Table 3 in the foregoing. For example, in the embodiments of this application, a field may be added to the DCI whose format is 0_0. For example, an antenna port downlink control information field (Antenna port(s) DCI field) may be added. The code division multiplexing groups without data (CDM groups without data) are indicated by using the added field, and the network device and the terminal device may query Table 1 based on the values of the code division multiplexing groups without data (CDM groups without data), to determine the power of the DMRS.

Alternatively, in another implementation, in the embodiments of this application, the network device and the terminal device may not need to pre-configure the correspondences in Table 2 or Table 3 in the foregoing.

For example, in the embodiments of this application, at least one bit, such as one bit, may be added to the DCI whose format is 0_0. When a value of the one bit is 0, the corresponding power of the DMRS is the regular power+0 dB, and when the value of the one bit is 1, the corresponding power of the DMRS is the regular power+3 dB. Alternatively, when a value of the one bit is 1, the corresponding power of the DMRS is the regular power+0 dB, and when the value of the one bit is 0, the corresponding power of the DMRS is the regular power+3 dB. The network device and the terminal device may then determine the power of the DMRS based on an indication of information about the at least one bit.

320: The terminal device sends the DMRS based on the determined power.

Correspondingly, the network device receives the DMRS.

Specifically, by using a method similar to that used by the terminal device, the network device may determine the power of the DMRS, and receive the DMRS based on the determined power of the DMRS. Specifically, for the method used by the network device to determine the power of the DMRS, refer to the descriptions in the foregoing.

For example, in a specific implementation process, the network device may determine the power of the DMRS by referring to correspondences described in Table 2.

It should be noted that, in a specific implementation process, some correspondences or all correspondences in Table 2 may be selected based on a specific requirement.

The uplink scheduling command is usually a command used for scheduling uplink data transmission. During the uplink data transmission, usually a corresponding DMRS also needs to be transmitted, so that the network device demodulates, based on the DMRS, data transmitted in a process of the uplink data transmission. Therefore, the uplink scheduling command associated with the DMRS may be understood as an uplink scheduling command that schedules the uplink data transmission during which the demodulation is performed based on the DMRS. In a specific implementation process, the uplink scheduling command may be DCI. Usually, the DCI includes a cyclic redundancy check (CRC) field, and the CRC field is scrambled based on a radio network temporary identity (RNTI) of a receiver device (such as the terminal device) of the DCI. In this way, the receiver device may perform blind detection based on the CRC in the DCI, to determine the DCI sent to the receiver device. Content related to the DCI and the CRC of the DCI has been clearly described in the prior art, and details are not described herein again. Usually, RNTIs may be specifically classified into a plurality of types, for example, but not limited to, a temporary configure RNTI (TC-RNTI) and a cell RNTI (C-RNTI). In addition, the quantity of symbols in the uplink transmission may be a quantity of OFDM symbols occupied during the uplink data transmission, that is, a quantity of OFDM symbols on which uplink data is distributed, or usually may be understood as a quantity of OFDM symbols occupied on a PUSCH.

Specifically, for definitions and functions of the foregoing RNTIs, refer to the prior art, for example, refer to stipulations in LTE. Details are not described herein again.

Actually, each row in Table 2 in the foregoing may be understood as representing a communication status. The first row to the ninth row respectively correspond to a communication status 1 to a communication status 9. It can be learned from this that, the network device may determine a current communication status (or referred to as a network status) based on a value of a network parameter, and query Table 2 in the foregoing based on the current communication status, to determine power of the DMRS corresponding to the current communication status.

It should be understood that, in this specification, cases of the nine uplink communication statuses are listed only as an example, and the embodiments of this application may further specifically include another uplink communication status. The embodiments of this application are not limited thereto.

It should be further understood that, a condition of a value of a parameter corresponding to each of the foregoing nine communication statuses is only an example. During actual application, the condition corresponding to each communication status may be increased or decreased in quantity, or conditions in different communication statuses may be mutually merged. The foregoing nine communication statuses may be mutually combined, merged, or nested. The embodiments of this application are not limited thereto.

Specifically, based on the pattern of the DMRS shown in FIG. 2, it can be learned that, only some REs in a symbol corresponding to the DMRS (DMRS symbol for short below) are used for transmitting the DMRS, and the other REs are not used for transmitting the DMRS.

When the current communication status is the communication status 1, the communication status 2, or the communication status 7, because a quantity of symbols occupied by the PUSCH is relatively small, and is less than or equal to two, the REs that are not used for transmitting the DMRS and that are in the DMRS symbol may be used for transmitting uplink data, thereby increasing a data transmission amount, to increase a network throughput. In this case, because a signal is transmitted in each RE in the DMRS symbol, the power of the DMRS does not need to be boosted, that is, the power of the DMRS is the regular power.

When the current communication status is the communication status 3, the communication status 4, or the communication status 8, because a quantity of symbols occupied in PUSCH transmission is relatively large, and is greater than two symbols, and an uplink data amount is relatively large in this case, to improve precision of a related estimation, the REs that are not used for transmitting the DMRS and that are in the DMRS symbol may be not used for transmitting uplink data. In this case, a signal is transmitted in each of only some REs in the DMRS symbol. Therefore, to ensure that power on all symbols is equal, the DMRS power needs to be boosted, that is, the power of the DMRS is the regular power+3 dB.

When the current communication status is the communication status 5, the communication status 6, or the communication status 9, to ensure a peak to average power ratio (PAPR) of a signal, the REs that are not used for transmitting the DMRS and that are in the DMRS symbol may be not used for transmitting uplink data. In this case, a signal is transmitted in each of only some REs in the DMRS symbol. Therefore, to ensure that power on all symbols is equal, the DMRS power needs to be boosted, that is, the power of the DMRS is the regular power+3 dB.

It should be understood that, in the embodiments of this application, the foregoing provides an example in which the format of the DCI of the uplink scheduling command associated with the DMRS is 0_0. However, the embodiments of this application are not limited thereto, provided that the format of the DCI of the uplink scheduling command associated with the DMRS is not 0_1. Therefore, the DCI whose format is 0_0 may be represented as DCI whose format is not 0_1.

It should be understood that, in the embodiments of this application, that the terminal device does not establish the RRC connection may alternatively be represented as that the terminal device does not receive a higher layer configuration (for example, but not limited to, the terminal device does not receive an RRC configuration). The embodiments of this application are not limited thereto.

It should be understood that, in the embodiments of this application, a symbol occupied in the uplink transmission may be a symbol occupied by a physical uplink shared channel (PUSCH).

It should be further understood that, in the embodiments of this application, the regular power may be not a fixed value, but a power value determined by the terminal device based on a usual practice when power boost is not considered.

In other words, when the power of the DMRS is the regular power, a corresponding power boost value is 0 dB. Therefore, for a uniform representation, that the power of the DMRS is the regular power may alternatively be represented as that the power of the DMRS is the regular power+0 dB. When the power of the DMRS is the regular power+3 dB, the corresponding power boost value is 3 dB.

The foregoing provides only an example in which the power boost value is 0 dB or 3 dB, but the embodiments of this application are not limited thereto. During actual application, with evolvement of a standard, the power boost value may be another possible value.

Based on the foregoing descriptions, it can be educed that, in the embodiments of this application, the nine communication statuses listed in the foregoing each correspond to one piece of power of the DMRS.

In the foregoing implementation, both the network device and the terminal device may directly determine the power of the DMRS based on a value of a network parameter by querying Table 2 in the foregoing.

Alternatively, in another implementation, in the embodiments of this application, the network device and the terminal device may indirectly obtain the power of the DMRS by querying a table.

Specifically, the network device and the terminal device may store correspondences between the values of the plurality of parameters in the foregoing and values of code division multiplexing groups without data (CDM groups without data). For example, the correspondences are shown in Table 3.

In a specific implementation process, the network device may determine, based on values of the foregoing parameters on a current network, values of code division multiplexing groups without data (CDM groups without data) corresponding to the foregoing parameters, and then query Table 1 based on the values of the code division multiplexing groups without data (CDM groups without data), to determine the power of the DMRS.

Alternatively, in another implementation, in the embodiments of this application, the network device and the terminal device may not need to pre-configure the correspondences in Table 2 or Table 3 in the foregoing. For example, in the embodiments of this application, a field may be added to the DCI whose format is 0_0. For example, an antenna port downlink control information field (Antenna port(s) DCI field) may be added. The code division multiplexing groups without data (CDM groups without data) are indicated by using the added field, and the network device and the terminal device may query Table 1 based on the values of the code division multiplexing groups without data (CDM groups without data), to determine the power of the DMRS.

Alternatively, in another implementation, in the embodiments of this application, the network device and the terminal device may not need to pre-configure the correspondences in Table 2 or Table 3 in the foregoing.

For example, in the embodiments of this application, at least one bit, such as one bit, may be added to the DCI whose format is 0_0. When a value of the one bit is 0, the corresponding power of the DMRS is the regular power+0 dB, and when the value of the one bit is 1, the corresponding power of the DMRS is the regular power+3 dB. Alternatively, when a value of the one bit is 1, the corresponding power of the DMRS is the regular power+0 dB, and when the value of the one bit is 0, the corresponding power of the DMRS is the regular power+3 dB. The network device and the terminal device may then determine the power of the DMRS based on an indication of information about the at least one bit.

In the embodiments of this application, the power of the DMRS can be flexibly determined for the different communication statuses. A problem of a single power compensation solution stipulated in current NR can be resolved, and requirements in the different communication statuses can be satisfied.

FIG. 4 describes a downlink transmission method according to an embodiment of this application. The method shown in FIG. 4 is described from a perspective of interaction between a network device and a terminal device. Specifically, a method 400 shown in FIG. 4 includes the following steps.

410: The network device determines power of a DMRS.

In a specific implementation process, the network device may determine the power of the DMRS by referring to correspondences described in Table 4.

TABLE 4

| DCI format/RRC connection | Waveform | Quantity of symbols in downlink transmission | DMRS power |
|---|---|---|---|
| A downlink scheduling command associated with a DMRS is downlink control information DCI whose format is 1_0. | CP-OFDM | Less than or equal to 2 | Regular power |
| No RRC connection is established. | CP-OFDM | Less than or equal to 2 | Regular power |
| A downlink scheduling command associated with a DMRS is downlink control information DCI whose format is 1_0. | CP-OFDM | Greater than 2 | Regular power + 3 dB |
| No RRC connection is established. | CP-OFDM | Greater than 2 | Regular power + 3 dB |
| A downlink scheduling command associated with a DMRS is DCI, and CRC of the DCI is scrambled by using an SI-RNTI, an RA-RNTI, a P-RNTI, and a TC-RNTI. | CP-OFDM | Less than or equal to 2 | Regular power |
| A downlink scheduling command associated with a DMRS is DCI, and CRC of the DCI is scrambled by using an SI-RNTI, an RA-RNTI, a P-RNTI, and a TC-RNTI. | CP-OFDM | Greater than 2 | Regular power + 3 dB |

It should be noted that, in a specific implementation process, some correspondences or all correspondences in the foregoing table may be selected based on a specific requirement.

The downlink scheduling command is usually a command used for scheduling downlink data transmission. During the downlink data transmission, usually a corresponding DMRS also needs to be transmitted, so that the terminal device demodulates, based on the DMRS, data transmitted in a process of the downlink data transmission. Therefore, the downlink scheduling command associated with the DMRS may be understood as a downlink scheduling command that schedules the downlink data transmission during which the demodulation is performed based on the DMRS. In a specific implementation process, the downlink scheduling command may be DCI. Usually, the DCI includes a CRC field, and the CRC field is scrambled based on an RNTI of a receiver device (such as the terminal device) of the DCI. In this way, the receiver device may perform blind detection based on the CRC in the DCI, to determine the DCI sent to the receiver device. Content related to the DCI and the CRC of the DCI has been clearly described in the prior art, and details are not described herein again. Usually, RNTIs may be specifically classified into a plurality of types, for example, but not limited to, a TC-RNTI, a C-RNTI, a paging RNTI (P-RNTI), a system information RNTI (SI-RNTI), a random access RNTI (RA-RNTI), and a configured scheduled RNTI (CS-RNTI). In addition, the quantity of symbols in the downlink transmission may be a quantity of OFDM symbols occupied during the downlink data transmission, that is, a quantity of OFDM symbols on which downlink data is distributed, or usually may be understood as a quantity of OFDM symbols occupied on a PDSCH.

Specifically, for definitions and functions of the foregoing RNTIs, refer to the prior art, for example, refer to stipulations in LTE. Details are not described herein again.

Actually, each row in Table 4 in the foregoing may be understood as representing a communication status. The first row to the sixth row respectively correspond to a communication status 1 to a communication status 6. It can be learned from this that, the network device may determine a current communication status (or referred to as a network status) based on a value of a network parameter, and query Table 3 in the foregoing based on the current communication status, to determine power of the DMRS corresponding to the current communication status.

Power of the DMRS corresponding to different communication statuses may be the same or may be different. The embodiments of this application are not limited thereto.

It should be understood that, in this specification, cases of the six downlink communication statuses are listed only as an example, and the embodiments of this application may further specifically include another downlink communication status. The embodiments of this application are not limited thereto.

It should be further understood that, a condition of a value of a parameter corresponding to each of the foregoing six communication statuses is only an example. During actual application, the condition corresponding to each communication status may be increased or decreased in quantity, or conditions in different communication statuses may be mutually merged. The foregoing six communication statuses may be mutually combined, merged, or nested. The embodiments of this application are not limited thereto.

Specifically, based on the pattern of the DMRS shown in FIG. 2, it can be learned that, only some REs in a symbol corresponding to the DMRS (DMRS symbol for short below) are used for transmitting the DMRS, and the other REs are not used for transmitting the DMRS.

When the current communication status is the communication status 1, the communication status 2, or the communication status 5, because a quantity of symbols occupied by the PDSCH is relatively small, and is less than or equal to two, the REs that are not used for transmitting the DMRS and that are in the DMRS symbol may be used for transmitting downlink data, thereby increasing a data transmission amount, to increase a network throughput. In this case, because a signal is transmitted in each RE in the DMRS symbol, the power of the DMRS does not need to be boosted, that is, the power of the DMRS is the regular power.

When the current communication status is the communication status 3, the communication status 4, or the communication status 6, because a quantity of symbols occupied in PDSCH transmission is relatively large, and is greater than two symbols, and an uplink data amount is relatively large in this case, to improve precision of a related estimation, the REs that are not used for transmitting the DMRS and that are in the DMRS symbol may be not used for transmitting uplink data. In this case, a signal is transmitted in each of only some REs in the DMRS symbol. Therefore, to ensure that power on all symbols is equal, the DMRS power needs to be boosted, that is, the power of the DMRS is the regular power+3 dB.

It should be understood that, in the embodiments of this application, the foregoing provides an example in which the format of the DCI of the downlink scheduling command associated with the DMRS is 1_0. However, the embodiments of this application are not limited thereto, provided that the format of the DCI of the uplink scheduling command associated with the DMRS is not 1_1. Therefore, the DCI whose format is 1_0 may be represented as DCI whose format is not 1_1.

It should be understood that, in the embodiments of this application, that the terminal device does not establish the RRC connection may alternatively be represented as that the terminal device does not receive a higher layer configuration (for example, but not limited to, the terminal device does not receive an RRC configuration). The embodiments of this application are not limited thereto.

It should be understood that, in the embodiments of this application, a symbol occupied in the downlink transmission may be a symbol occupied by a physical downlink shared channel (PDSCH).

It should be further understood that, in the embodiments of this application, the regular power may be not a fixed value, but a power value determined by the terminal device based on a usual practice when power boost is not considered.

In other words, when the power of the DMRS is the regular power, a corresponding power boost value is 0 dB. Therefore, for a uniform representation, that the power of the DMRS is the regular power may alternatively be represented as that the power of the DMRS is the regular power+0 dB. When the power of the DMRS is the regular power+3 dB, the corresponding power boost value is 3 dB.

The foregoing provides only an example in which the power boost value is 0 dB or 3 dB, but the embodiments of this application are not limited thereto. During actual application, with evolvement of a standard, the power boost value may be another possible value.

Based on the foregoing descriptions, it can be educed that, in the embodiments of this application, the six communication statuses listed in the foregoing each correspond to one piece of power of the DMRS.

In the foregoing implementation, both the network device and the terminal device may directly determine the power of the DMRS based on a value of a network parameter by querying Table 4 in the foregoing.

Alternatively, in another implementation, in the embodiments of this application, the network device and the terminal device may indirectly obtain the power of the DMRS by querying a table.

Specifically, the network device and the terminal device may store correspondences between the values of the plurality of parameters in the foregoing and values of code division multiplexing groups without data (CDM groups without data). For example, the correspondences are shown in Table 5 in the following.

TABLE 5

| DCI format/RRC connection | Waveform | Quantity of symbols in uplink transmission | Number of DM-RS CDM groups without data |
|---|---|---|---|
| A downlink scheduling command associated with a DMRS is downlink control information DCI whose format is 1_0. | CP-OFDM | Less than or equal to 2 | 1 |
| No RRC connection is established. | CP-OFDM | Less than or equal to 2 | 1 |
| A downlink scheduling command associated with a DMRS is downlink control information DCI whose format is 1_0. | CP-OFDM | Greater than 2 | 2 |
| No RRC connection is established. | CP-OFDM | Greater than 2 | 2 |
| A downlink scheduling command associated with a DMRS is DCI, and CRC of the DCI is scrambled by using an SI-RNTI, an RA-RNTI, a P-RNTI, and a TC-RNTI. | CP-OFDM | Less than or equal to 2 | 1 |
| A downlink scheduling command associated with a DMRS is DCI, and CRC of the DCI is scrambled by using an SI-RNTI, an RA-RNTI, a P-RNTI, and a TC-RNTI. | CP-OFDM | Greater than 2 | 2 |

In a specific implementation process, the network device may determine, based on values of the foregoing parameters on a current network, values of code division multiplexing groups without data (CDM groups without data) corresponding to the foregoing parameters, and then query Table 1 based on the values of the code division multiplexing groups without data (CDM groups without data), to determine the power of the DMRS.

Alternatively, in another implementation, in the embodiments of this application, the network device and the terminal device may not need to pre-configure the correspondences in Table 4 or Table 5 in the foregoing. For example, in the embodiments of this application, a field may be added to the DCI whose format is 1_0. For example, an antenna port downlink control information field (Antenna port(s) DCI field) may be added. The code division multiplexing groups without data (CDM groups without data) are indicated by using the added field, and the network device and the terminal device may query Table 1 based on the values of the code division multiplexing groups without data (CDM groups without data), to determine the power of the DMRS.

Alternatively, in another implementation, in the embodiments of this application, the network device and the terminal device may not need to pre-configure the correspondences in Table 4 or Table 5 in the foregoing.

For example, in the embodiments of this application, at least one bit, such as one bit, may be added to the DCI whose format is 1_0. When a value of the one bit is 0, the corresponding power of the DMRS is the regular power+0 dB, and when the value of the one bit is 1, the corresponding power of the DMRS is the regular power+3 dB. Alternatively, when a value of the one bit is 1, the corresponding power of the DMRS is the regular power+0 dB, and when the value of the one bit is 0, the corresponding power of the DMRS is the regular power+3 dB. The network device and the terminal device may then determine the power of the DMRS based on an indication of information about the at least one bit.

420: The network device sends the DMRS based on the determined power.

Correspondingly, the terminal device receives the DMRS.

Specifically, by using a method similar to that used by the network device, the terminal device may determine the power of the DMRS, and receive the DMRS based on the determined power of the DMRS. Specifically, for the method used by the terminal device to determine the power of the DMRS, refer to the descriptions in the foregoing.

For example, the terminal device may determine the power of the DMRS by referring to correspondences described in Table 4.

It should be noted that, in a specific implementation process, some correspondences or all correspondences in Table 4 may be selected based on a specific requirement.

The downlink scheduling command is usually a command used for scheduling downlink data transmission. During the downlink data transmission, usually a corresponding DMRS also needs to be transmitted, so that the terminal device demodulates, based on the DMRS, data transmitted in a process of the downlink data transmission. Therefore, the downlink scheduling command associated with the DMRS may be understood as a downlink scheduling command that schedules the downlink data transmission during which the demodulation is performed based on the DMRS. In a specific implementation process, the downlink scheduling command may be DCI. Usually, the DCI includes a CRC field, and the CRC field is scrambled based on an RNTI of a receiver device (such as the terminal device) of the DCI. In this way, the receiver device may perform blind detection based on the CRC in the DCI, to determine the DCI sent to the receiver device. Content related to the DCI and the CRC of the DCI has been clearly described in the prior art, and details are not described herein again. Usually, RNTIs may be specifically classified into a plurality of types, for example, but not limited to, a TC-RNTI, a C-RNTI, a paging RNTI (P-RNTI), a system information RNTI (SI-RNTI), a random access RNTI (RA-RNTI), and a configured scheduled RNTI (CS-RNTI). In addition, the quantity of symbols in the downlink transmission may be a quantity of OFDM symbols occupied during the downlink data transmission, that is, a quantity of OFDM symbols on which downlink data is distributed, or usually may be understood as a quantity of OFDM symbols occupied on a PDSCH.

Specifically, for definitions and functions of the foregoing RNTIs, refer to the prior art, for example, refer to stipulations in LTE. Details are not described herein again.

Actually, each row in Table 4 in the foregoing may be understood as representing a communication status. The first row to the sixth row respectively correspond to a communication status 1 to a communication status 6. It can be learned from this that, the terminal device may determine a current communication status (or referred to as a network status) based on a value of a network parameter, and query Table 3 in the foregoing based on the current communication status, to determine power of the DMRS corresponding to the current communication status.

It should be understood that, in this specification, cases of the six downlink communication statuses are listed only as an example, and the embodiments of this application may further specifically include another uplink communication status. The embodiments of this application are not limited thereto.

It should be further understood that, a condition of a value of a parameter corresponding to each of the foregoing six communication statuses is only an example. During actual application, the condition corresponding to each communication status may be increased or decreased in quantity, or conditions in different communication statuses may be mutually merged. The foregoing six communication statuses may be mutually combined, merged, or nested. The embodiments of this application are not limited thereto.

Specifically, based on the pattern of the DMRS shown in FIG. 2, it can be learned that, only some REs in a symbol corresponding to the DMRS (DMRS symbol for short below) are used for transmitting the DMRS, and the other REs are not used for transmitting the DMRS.

When the current communication status is the communication status 1, the communication status 2, or the communication status 5, because a quantity of symbols occupied by the PDSCH is relatively small, and is less than or equal to two, the REs that are not used for transmitting the DMRS and that are in the DMRS symbol may be used for transmitting downlink data, thereby increasing a data transmission amount, to increase a network throughput. In this case, because a signal is transmitted in each RE in the DMRS symbol, the power of the DMRS does not need to be boosted, that is, the power of the DMRS is the regular power.

When the current communication status is the communication status 3, the communication status 4, or the communication status 6, because a quantity of symbols occupied in PDSCH transmission is relatively large, and is greater than two symbols, and an uplink data amount is relatively large in this case, to improve precision of a related estimation, the REs that are not used for transmitting the DMRS and that are in the DMRS symbol may be not used for transmitting uplink data. In this case, a signal is transmitted in each of only some REs in the DMRS symbol. Therefore, to ensure that power on all symbols is equal, the DMRS power needs to be boosted, that is, the power of the DMRS is the regular power+3 dB.

It should be understood that, in the embodiments of this application, the foregoing provides an example in which the format of the DCI of the downlink scheduling command associated with the DMRS is 1_0. However, the embodiments of this application are not limited thereto, provided that the format of the DCI of the uplink scheduling command associated with the DMRS is not 1_1. Therefore, the DCI whose format is 1_0 may be represented as DCI whose format is not 1_1.

It should be understood that, in the embodiments of this application, that the terminal device does not establish the RRC connection may alternatively be represented as that the terminal device does not receive a higher layer configuration (for example, but not limited to, the terminal device does not receive an RRC configuration). The embodiments of this application are not limited thereto.

It should be understood that, in the embodiments of this application, a symbol occupied in the downlink transmission may be a symbol occupied by a physical downlink shared channel (PDSCH).

It should be further understood that, in the embodiments of this application, the regular power may be not a fixed value, but a power value determined by the terminal device based on a usual practice when power boost is not considered.

In other words, when the power of the DMRS is the regular power, a corresponding power boost value is 0 dB. Therefore, for a uniform representation, that the power of the DMRS is the regular power may alternatively be represented as that the power of the DMRS is the regular power+0 dB. When the power of the DMRS is the regular power+3 dB, the corresponding power boost value is 3 dB.

The foregoing provides only an example in which the power boost value is 0 dB or 3 dB, but the embodiments of this application are not limited thereto. During actual application, with evolvement of a standard, the power boost value may be another possible value.

Based on the foregoing descriptions, it can be educed that, in the embodiments of this application, the six communication statuses listed in the foregoing each correspond to one piece of power of the DMRS.

In the foregoing implementation, both the network device and the terminal device may directly determine the power of the DMRS based on a value of a network parameter by querying Table 4 in the foregoing.

Alternatively, in another implementation, in the embodiments of this application, the network device and the terminal device may indirectly obtain the power of the DMRS by querying a table.

Specifically, the network device and the terminal device may store correspondences between the values of the plurality of parameters in the foregoing and values of code division multiplexing groups without data (CDM groups without data). For example, the correspondences are shown in Table 5.

In a specific implementation process, the terminal device may determine, based on values of the foregoing parameters on a current network, values of code division multiplexing groups without data (CDM groups without data) corresponding to the foregoing parameters, and then query Table 1 based on the values of the code division multiplexing groups without data (CDM groups without data), to determine the power of the DMRS.

Alternatively, in another implementation, in the embodiments of this application, the network device and the terminal device may not need to pre-configure the correspondences in Table 4 or Table 5 in the foregoing. For example, in the embodiments of this application, a field may be added to the DCI whose format is 1_0. For example, an antenna port downlink control information field (Antenna port(s) DCI field) may be added. The code division multiplexing groups without data (CDM groups without data) are indicated by using the added field, and the network device and the terminal device may query Table 1 based on the values of the code division multiplexing groups without data (CDM groups without data), to determine the power of the DMRS.

Alternatively, in another implementation, in the embodiments of this application, the network device and the terminal device may not need to pre-configure the correspondences in Table 4 or Table 5 in the foregoing.

For example, in the embodiments of this application, at least one bit, such as one bit, may be added to the DCI whose format is 1_0. When a value of the one bit is 0, the corresponding power of the DMRS is the regular power+0 dB, and when the value of the one bit is 1, the corresponding power of the DMRS is the regular power+3 dB. Alternatively, when a value of the one bit is 1, the corresponding power of the DMRS is the regular power+0 dB, and when the value of the one bit is 0, the corresponding power of the DMRS is the regular power+3 dB. The network device and the terminal device may then determine the power of the DMRS based on an indication of information about the at least one bit.

In the embodiments of this application, the power of the DMRS can be flexibly determined for the different communication statuses. A problem of a single power compensation solution stipulated in current NR can be resolved, and requirements in the different communication statuses can be satisfied.

It should be understood that, the examples in FIG. 1 to FIG. 4 in the foregoing are only for helping a person skilled in the art understand the embodiments of the present invention, but not for limiting the embodiments of the present invention to the specific values or the specific scenarios in the examples. The person skilled in the art apparently can make various equivalent modifications or changes according to the examples shown in FIG. 1 to FIG. 4, and such modifications or changes also fall within the scope of the embodiments of the present invention.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes the methods in the embodiments of the present invention in detail with reference to FIG. 1 to FIG. 4, and the following describes communications apparatuses in the embodiments of the present invention with reference to FIG. 5 to FIG. 8.

Figure 5:
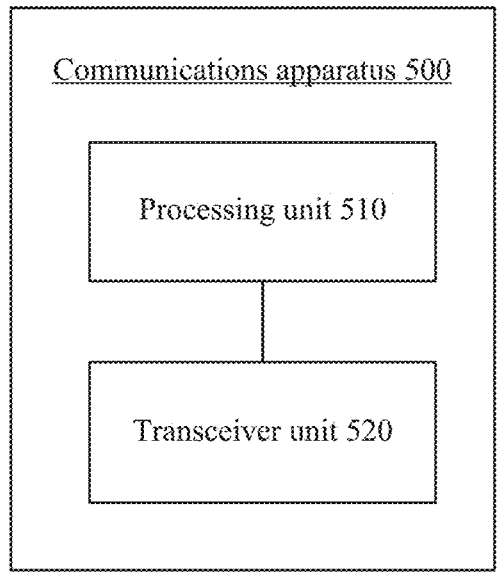
FIG. 5 is a schematic block diagram of a communications apparatus according to this application.

FIG. 5 is a schematic diagram of a communications apparatus according to an embodiment of this application. The communications apparatus 500 may include:

a processing unit 510 and a transceiver unit 520.

Specifically, the processing unit is configured to determine power of a DMRS; and the transceiver unit is configured to send the DMRS based on the determined power.

Optionally, the power of the DMRS is regular power when an uplink scheduling command associated with the DMRS is downlink control information DCI whose format is 0_0, an uplink transmission waveform is cyclic prefix-orthogonal frequency division multiplexing CP-OFDM, and a quantity of symbols occupied in uplink transmission is less than or equal to 2.

Optionally, the power of the DMRS is the regular power when a terminal device does not establish a radio resource control RRC connection, the uplink transmission waveform is the cyclic prefix-orthogonal frequency division multiplexing CP-OFDM, and the quantity of symbols occupied in the uplink transmission is less than or equal to 2.

Optionally, the power of the DMRS is the regular power+3 dB when the uplink scheduling command associated with the DMRS is the DCI whose format is 0_0, the uplink transmission waveform is the CP-OFDM, and the quantity of symbols occupied in the uplink transmission is greater than 2.

Optionally, the power of the DMRS is regular power+3 dB when a terminal device does not establish an RRC connection, an uplink transmission waveform is CP-OFDM, and a quantity of symbols occupied in uplink transmission is greater than 2.

Optionally, the power of the DMRS is the regular power+3 dB when the uplink scheduling command associated with the DMRS is the DCI whose format is 0_0 and the uplink transmission waveform is discrete Fourier transform-spread spectrum orthogonal frequency division multiplexing multiple access DFT-s-OFDM.

Optionally, the power of the DMRS is the regular power+3 dB when the terminal device does not establish the RRC connection and the uplink transmission waveform is the discrete Fourier transform-spread spectrum orthogonal frequency division multiplexing multiple access DFT-s-OFDM.

Optionally, the power of the DMRS is the regular power when the uplink scheduling command associated with the DMRS is DCI, cyclic redundancy check CRC of the DCI is scrambled by using a temporary configure radio network temporary identity TC-RNTI, the uplink transmission waveform is the cyclic prefix-orthogonal frequency division multiplexing CP-OFDM, and the quantity of symbols occupied in the uplink transmission is less than or equal to 2.

Optionally, the power of the DMRS is the regular power+3 dB when the uplink scheduling command associated with the DMRS is the DCI, the CRC of the DCI is scrambled by using the TC-RNTI, the uplink transmission waveform is the CP-OFDM, and the quantity of symbols occupied in the uplink transmission is greater than 2.

Optionally, the power of the DMRS is the regular power+3 dB when the uplink scheduling command associated with the DMRS is the DCI, the CRC of the DCI is scrambled by using the TC-RNTI, and the uplink transmission waveform is the DFT-s-OFDM.

The communications apparatus 500 provided in this application corresponds to the process performed by the terminal device in the method embodiment in FIG. 3. For functions of the units/modules in the communications apparatus, refer to the descriptions in the foregoing. Details are not described herein again.

In the embodiments of this application, the power of the DMRS can be flexibly determined for the different communication statuses. A problem of a single power compensation solution stipulated in current NR can be resolved, and requirements in the different communication statuses can be satisfied.

Figure 6:
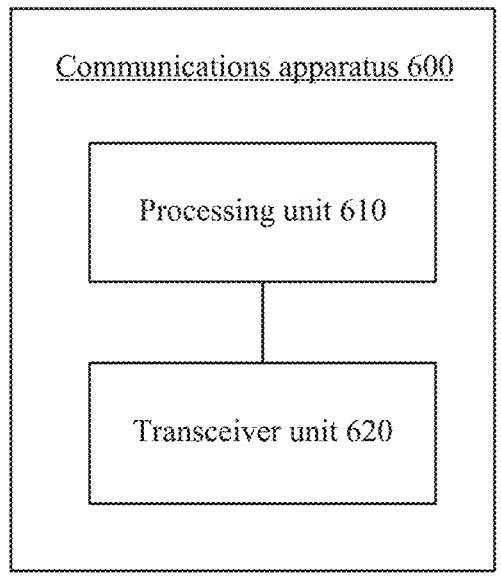
FIG. 6 is a schematic block diagram of another communications apparatus according to this application.

FIG. 6 is a schematic diagram of a communications apparatus according to an embodiment of this application. The communications apparatus 600 may include:

a processing unit 610 and a transceiver unit 620.

Specifically, the processing unit is configured to determine power of a DMRS; and the transceiver unit is configured to receive the DMRS based on the determined power.

Optionally, the power of the DMRS is regular power when a downlink scheduling command associated with the DMRS is downlink control information DCI whose format is 1_0, a downlink transmission waveform is cyclic prefix-orthogonal frequency division multiplexing CP-OFDM, and a quantity of symbols occupied in downlink transmission is less than or equal to 2.

Optionally, the power of the DMRS is the regular power when a terminal device does not establish a radio resource control RRC connection, the downlink transmission waveform is the cyclic prefix-orthogonal frequency division multiplexing CP-OFDM, and the quantity of symbols occupied in the downlink transmission is less than or equal to 2.

Optionally, the power of the DMRS is the regular power+3 dB when the downlink scheduling command associated with the DMRS is the DCI whose format is 1_0, the downlink transmission waveform is the CP-OFDM, and the quantity of symbols occupied in the downlink transmission is greater than 2.

Optionally, the power of the DMRS is the regular power+3 dB when the terminal device does not establish the RRC connection, the downlink transmission waveform is the CP-OFDM, and the quantity of symbols occupied in the downlink transmission is greater than 2.

Optionally, the power of the DMRS is the regular power when the downlink scheduling command associated with the DMRS is the DCI, cyclic redundancy check CRC of the DCI is scrambled by using a system information radio network temporary identity SI-RNTI, a random access radio network temporary identity RA-RNTI, a paging radio network temporary identity P-RNTI, or a temporary configure radio network temporary identity TC-RNTI, the downlink transmission waveform is the cyclic prefix-orthogonal frequency division multiplexing CP-OFDM, and the quantity of symbols occupied in the downlink transmission is less than or equal to 2.

Optionally, the power of the DMRS is the regular power+3 dB when the downlink scheduling command associated with the DMRS is the DCI, the CRC of the DCI is scrambled by using the SI-RNTI, the RA-RNTI, the P-RNTI, or the TC-RNTI, the downlink transmission waveform is the CP-OFDM, and the quantity of symbols occupied in the downlink transmission is greater than 2.

The communications apparatus 600 provided in this application corresponds to the process performed by the terminal device in the method embodiment in FIG. 4. For functions of the units/modules in the communications apparatus, refer to the descriptions in the foregoing. Details are not described herein again.

In the embodiments of this application, the power of the DMRS can be flexibly determined for the different communication statuses. A problem of a single power compensation solution stipulated in current NR can be resolved, and requirements in the different communication statuses can be satisfied.

It should be understood that, the communications apparatuses in FIG. 5 and FIG. 6 may be terminal devices, or may be chips or integrated circuits installed on a terminal device.

Figure 7:
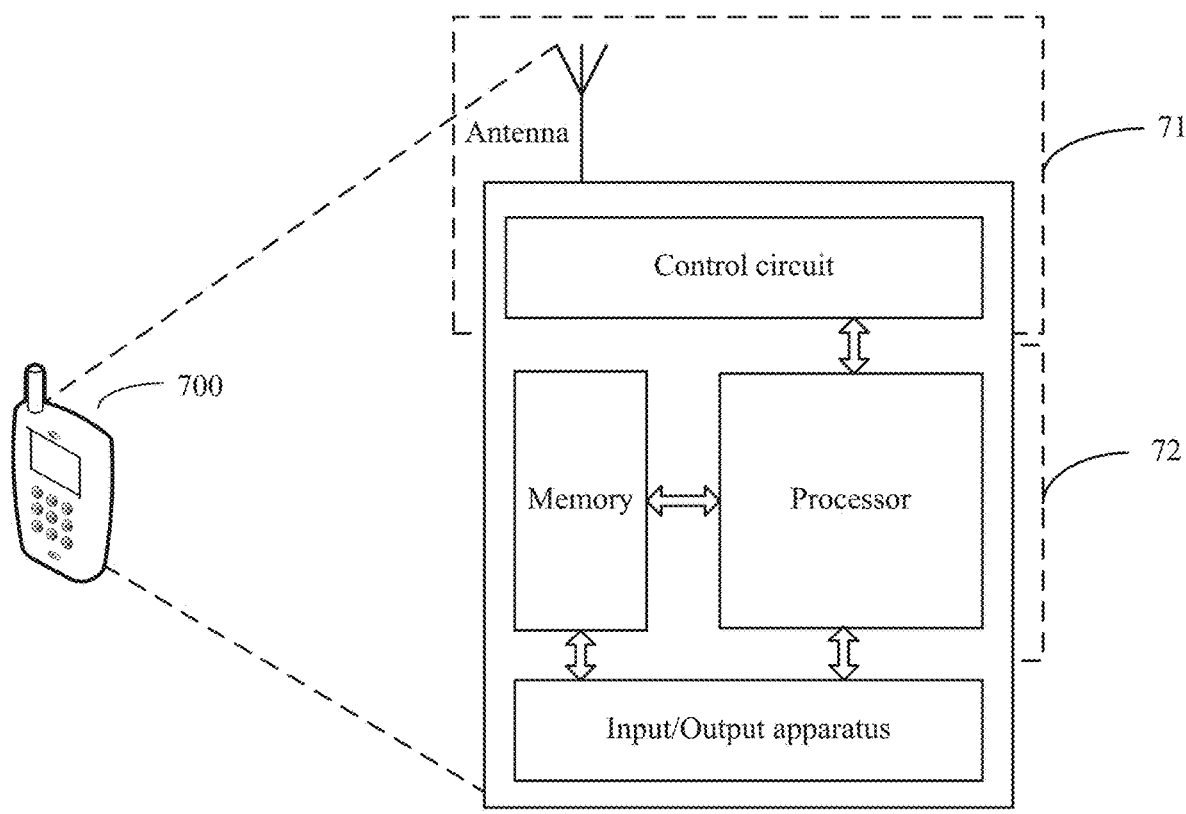
FIG. 7 is a schematic block diagram of a terminal device according to this application.

Using an example in which a communications apparatus is a terminal device, FIG. 7 is a schematic structural diagram of a terminal device according to an embodiment of this application. For ease of understanding and illustration, in FIG. 7, a mobile phone is used as an example of the terminal device. FIG. 7 shows only main parts of the terminal device. As shown in FIG. 7, the terminal device 700 includes a processor, a memory, a control circuit, an antenna, and an input/output apparatus. The processor is mainly configured to: process a communication protocol and communication data, control an entire terminal device, execute a software program, and process data of the software program, for example, configured to support the terminal device in performing the actions described in the foregoing method embodiments. The memory is mainly configured to store the software program and data. The control circuit is mainly configured to: convert a baseband signal and a radio frequency signal, and process the radio frequency signal. The control circuit together with the antenna may also be referred to as a transceiver, mainly configured to receive and send a radio frequency signal of an electromagnetic wave form. The input/output apparatus, such as a touchscreen, a display, or a keyboard, is mainly configured to: receive data entered by a user and output data to the user.

After the terminal device is turned on, the processor may read the software program stored in the storage unit, explain and execute an instruction of the software program, and process the data of the software program. When data needs to be wirelessly sent, after performing baseband processing on the to-be-sent data, the processor outputs a baseband signal to a radio frequency circuit. After performing radio frequency processing on the baseband signal, the radio frequency circuit sends the radio frequency signal in a form of electromagnetic wave by using the antenna. When data is sent to the terminal device, the radio frequency circuit receives the radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 7 shows only one memory and one processor. In an actual terminal device, a plurality of processors and a plurality of memories may exist. A memory may also be referred to as a storage medium, a storage device, or the like. This is not limited in the embodiments of this application.

In an optional implementation, the processor may include a baseband processor and a central processing unit. The baseband processor is mainly configured to process a communications protocol and communication data. The central processing unit is mainly configured to: control the entire terminal device, execute the software program, and process the data of the software program. The processor in FIG. 7 may integrate functions of the baseband processor and the central processing unit. The person skilled in the art may understand that the baseband processor and the central processing unit may be respectively independent processors, and are interconnected by using a technology such as a bus. The person skilled in the art may understand that, the terminal device may include a plurality of baseband processors to adapt to different network communications standards, the terminal device may include a plurality of central processing units to enhance a processing capability of the terminal device, and parts of the terminal device may be connected by using various buses. The baseband processor may also be represented as a baseband processing circuit or a baseband processing chip. The central processing unit may also be represented as a central processing circuit or a central processing chip. A function of processing the communications protocol and the communication data may be set in the processor, or may be stored in the storage unit in a software program form. The processor executes the software program, to implement a baseband processing function.

In the embodiments of the present invention, an antenna and a control circuit having sending and receiving functions may be considered as a transceiver unit 71 of the terminal device 700, for example, to support the terminal device in performing the sending and receiving functions performed by the terminal device in the method implementation in FIG. 5 or FIG. 6. A processor having a processing function is considered as a processing unit 72 of the terminal device 700, and the processor corresponds to the processing unit 510 in FIG. 5 or the processing unit 610 in FIG. 6. As shown in FIG. 7, the terminal device 700 includes the transceiver unit 71 and the processing unit 72. The transceiver unit may also be referred to as a transceiver, a transceiver machine, a transceiver apparatus, or the like. The transceiver unit corresponds to the transceiver unit 520 in FIG. 5 or the transceiver unit 620 in FIG. 6. Optionally, a component that is in the transceiver unit 71 and that is configured to implement the receiving function may be considered as a receiving unit. A component that is in the transceiver unit 71 and that is configured to implement the sending function may be considered as a sending unit. In other words, the transceiver unit 71 includes the receiving unit and the sending unit, the receiving unit may also be referred to as a receiver, an input port, a receiver circuit, or the like, and the sending unit may be referred to as a transmit machine, transmitter, a transmit circuit, or the like.

The processing unit 72 may be configured to execute an instruction stored in the memory, to control the transceiver unit 71 to receive a signal and/or send a signal, completing the functions of the terminal device in the foregoing method embodiments. In an implementation, it may be considered that a function of the transceiver unit 71 is implemented by using a transceiver circuit, or a chip dedicated for receiving and sending.

It should be understood that, the terminal device 700 shown in FIG. 7 can implement processes related to the terminal device in the method embodiment in FIG. 5 or FIG. 6. Operations and/or functions of the modules in the terminal device 700 are respectively for implementing corresponding procedures in the foregoing method embodiments. For details, refer to the descriptions in the method embodiments. To avoid repetition, details are properly omitted herein.

Figure 8:
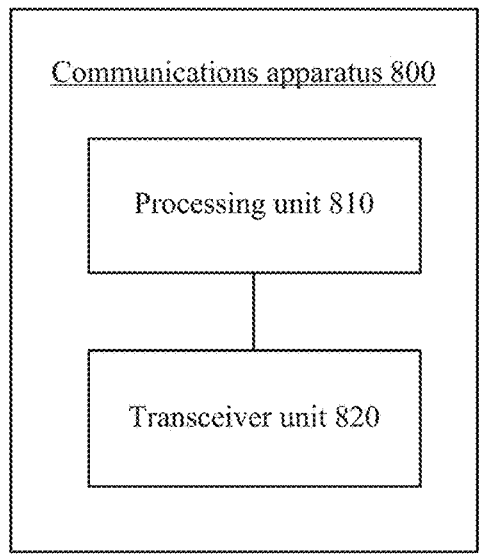
FIG. 8 is a schematic block diagram of another communications apparatus according to this application.

FIG. 8 is a schematic diagram of a communications apparatus according to an embodiment of this application. The apparatus 800 may include:

a processing unit 810 and a transceiver unit 820.

Specifically, the processing unit is configured to determine power of a DMRS; and the transceiver unit is configured to receive the DMRS based on the determined power.

Optionally, the power of the DMRS is regular power when an uplink scheduling command associated with the DMRS is downlink control information DCI whose format is 0_0, an uplink transmission waveform is cyclic prefix-orthogonal frequency division multiplexing CP-OFDM, and a quantity of symbols occupied in uplink transmission is less than or equal to 2.

Optionally, the power of the DMRS is the regular power when a terminal device does not establish a radio resource control RRC connection, the uplink transmission waveform is the cyclic prefix-orthogonal frequency division multiplexing CP-OFDM, and the quantity of symbols occupied in the uplink transmission is less than or equal to 2.

Optionally, the power of the DMRS is the regular power+3 dB when the uplink scheduling command associated with the DMRS is the DCI whose format is 0_0, the uplink transmission waveform is the CP-OFDM, and the quantity of symbols occupied in the uplink transmission is greater than 2.

Optionally, the power of the DMRS is regular power+3 dB when a terminal device does not establish an RRC connection, an uplink transmission waveform is CP-OFDM, and a quantity of symbols occupied in uplink transmission is greater than 2.

Optionally, the power of the DMRS is the regular power+3 dB when the uplink scheduling command associated with the DMRS is the DCI whose format is 0_0 and the uplink transmission waveform is discrete Fourier transform-spread spectrum orthogonal frequency division multiplexing multiple access DFT-s-OFDM.

Optionally, the power of the DMRS is the regular power+3 dB when the terminal device does not establish the RRC connection and the uplink transmission waveform is the discrete Fourier transform-spread spectrum orthogonal frequency division multiplexing multiple access DFT-s-OFDM.

Optionally, the power of the DMRS is the regular power when the uplink scheduling command associated with the DMRS is DCI, cyclic redundancy check CRC of the DCI is scrambled by using a temporary configure radio network temporary identity TC-RNTI, the uplink transmission waveform is the cyclic prefix-orthogonal frequency division multiplexing CP-OFDM, and the quantity of symbols occupied in the uplink transmission is less than or equal to 2.

Optionally, the power of the DMRS is the regular power+3 dB when the uplink scheduling command associated with the DMRS is the DCI, the CRC of the DCI is scrambled by using the TC-RNTI, the uplink transmission waveform is the CP-OFDM, and the quantity of symbols occupied in the uplink transmission is greater than 2.

Optionally, the power of the DMRS is the regular power+3 dB when the uplink scheduling command associated with the DMRS is the DCI, the CRC of the DCI is scrambled by using the TC-RNTI, and the uplink transmission waveform is the DFT-s-OFDM.

The communications apparatus 800 provided in this application corresponds to the process performed by the network device in the method embodiment in FIG. 3. For functions of the units/modules in the communications apparatus, refer to the descriptions in the foregoing. Details are not described herein again.

In the embodiments of this application, the power of the DMRS can be flexibly determined for the different communication statuses. A problem of a single power compensation solution stipulated in current NR can be resolved, and requirements in the different communication statuses can be satisfied.

Figure 9:
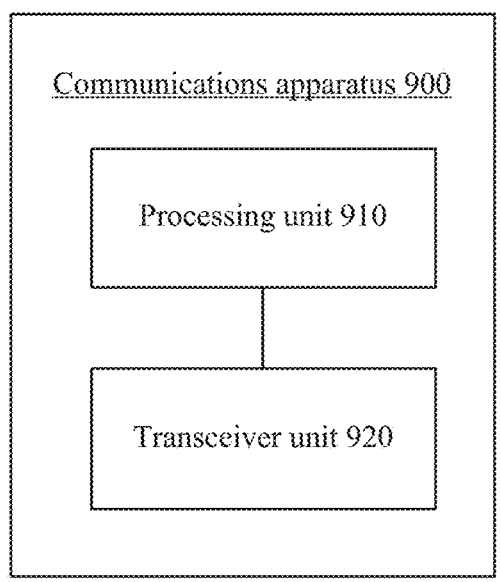
FIG. 9 is a schematic block diagram of another communications apparatus according to this application.

FIG. 9 is a schematic diagram of a communications apparatus according to an embodiment of this application. The apparatus 900 may include:

a processing unit 910 and a transceiver unit 920.

Specifically, the processing unit is configured to determine power of a DMRS; and the transceiver unit is configured to send the DMRS based on the determined power.

Optionally, the power of the DMRS is regular power when a downlink scheduling command associated with the DMRS is downlink control information DCI whose format is 1_0, a downlink transmission waveform is cyclic prefix-orthogonal frequency division multiplexing CP-OFDM, and a quantity of symbols occupied in downlink transmission is less than or equal to 2.

Optionally, the power of the DMRS is the regular power when a terminal device does not establish a radio resource control RRC connection, the downlink transmission waveform is the cyclic prefix-orthogonal frequency division multiplexing CP-OFDM, and the quantity of symbols occupied in the downlink transmission is less than or equal to 2.

Optionally, the power of the DMRS is the regular power+3 dB when the downlink scheduling command associated with the DMRS is the DCI whose format is 1_0, the downlink transmission waveform is the CP-OFDM, and the quantity of symbols occupied in the downlink transmission is greater than 2.

Optionally, the power of the DMRS is the regular power+3 dB when the terminal device does not establish the RRC connection, the downlink transmission waveform is the CP-OFDM, and the quantity of symbols occupied in the downlink transmission is greater than 2.

Optionally, the power of the DMRS is the regular power when the downlink scheduling command associated with the DMRS is the DCI, cyclic redundancy check CRC of the DCI is scrambled by using a system information radio network temporary identity SI-RNTI, a random access radio network temporary identity RA-RNTI, a paging radio network temporary identity P-RNTI, or a temporary configure radio network temporary identity TC-RNTI, the downlink transmission waveform is the cyclic prefix-orthogonal frequency division multiplexing CP-OFDM, and the quantity of symbols occupied in the downlink transmission is less than or equal to 2.

Optionally, the power of the DMRS is the regular power+3 dB when the downlink scheduling command associated with the DMRS is the DCI, the CRC of the DCI is scrambled by using the SI-RNTI, the RA-RNTI, the P-RNTI, or the TC-RNTI, the downlink transmission waveform is the CP-OFDM, and the quantity of symbols occupied in the downlink transmission is greater than 2.

The communications apparatus 900 provided in this application corresponds to the process performed by the network device in the method embodiment in FIG. 4. For functions of the units/modules in the communications apparatus, refer to the descriptions in the foregoing. Details are not described herein again.

In the embodiments of this application, the power of the DMRS can be flexibly determined for the different communication statuses. A problem of a single power compensation solution stipulated in current NR can be resolved, and requirements in the different communication statuses can be satisfied.

It should be understood that, the communications apparatus in FIG. 8 or FIG. 9 may be a network device, or may be a chip or an integrated circuit installed on a network device.

Figure 10:
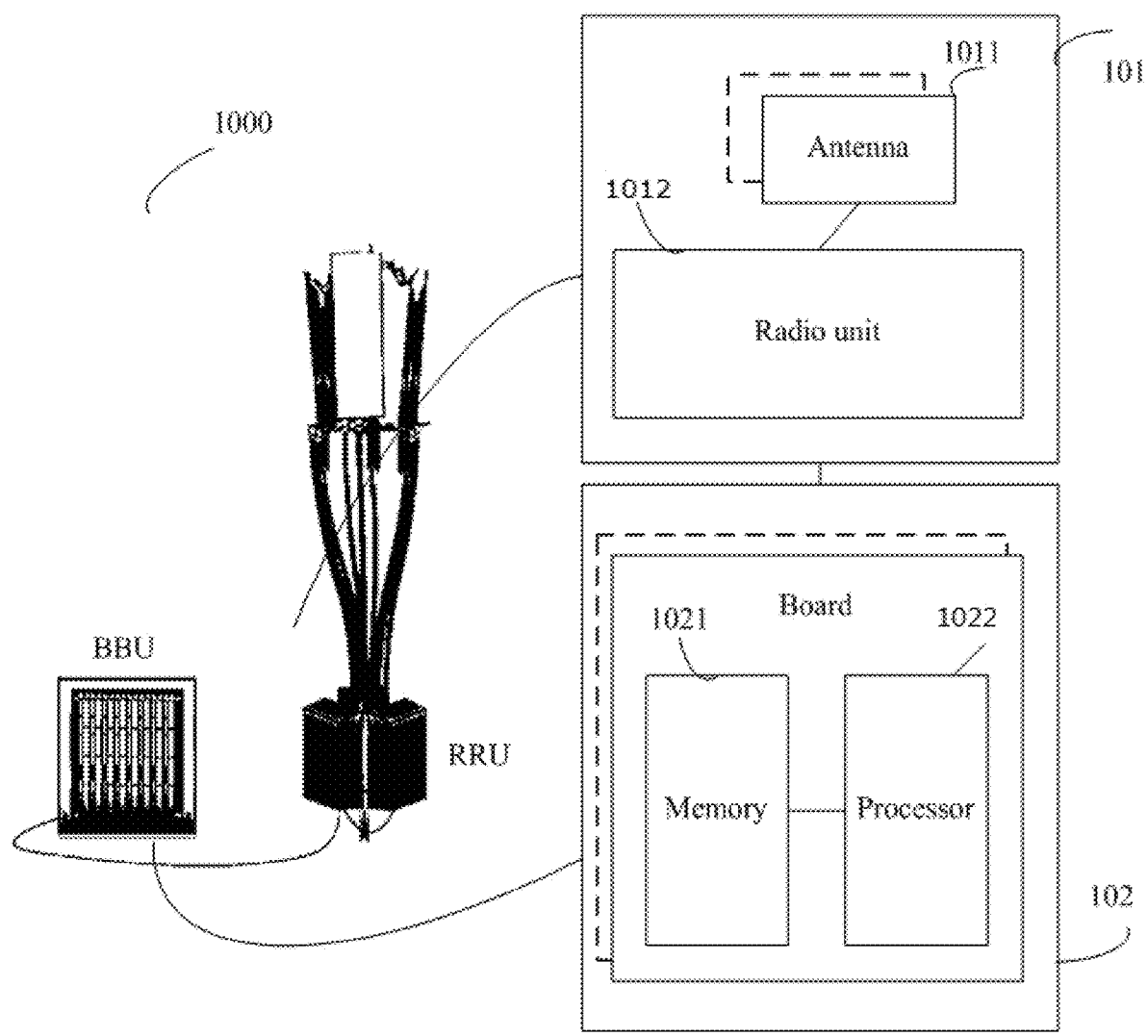
FIG. 10 is a schematic block diagram of a network device according to this application.

Using an example in which a communications apparatus is a network device, FIG. 10 is a schematic structural diagram of a network device according to an embodiment of this application, for example, may be a schematic structural diagram of a base station. As shown in FIG. 10, the network device 1000 may be applied to the system shown in FIG. 1, to perform the functions of the network device in the foregoing method embodiments.

The network device 1000 may include one or more radio units, such as a remote radio unit (RRU) 101, and one or more baseband units (BBU) (that may also be referred to as a digital unit, digital unit, DU) 102. The RRU 101 may be referred to as a transceiver unit 101, and correspond to the transceiver unit 820 in FIG. 8 or the transceiver unit 920 in FIG. 9. Optionally, the transceiver unit may also be referred to as a transceiver machine, a transceiver circuit, a transceiver, or the like, and the transceiver unit may include at least one antenna 1011 and radio unit 1012. The RRU 101 part is mainly configured to: receive and send a radio-frequency signal, and perform conversion between a radio-frequency signal and a baseband signal, for example, configured to send precoding matrix information to a terminal device. The BBU 102 part is partially mainly configured to: perform baseband processing, control the base station, and the like. The RRU 101 and the BBU 102 may be physically disposed together, or may be physically disposed separate from each other, that is, as a distributed base station.

The BBU 102 is a control center of the base station, may also be referred to as a processing unit 102, may correspond to the processing unit 810 in FIG. 8 and the processing unit 910 in FIG. 9, and is mainly configured to complete a baseband processing function, such as channel encoding, multiplexing, modulation, or spectrum spreading. For example, the BBU (the processing unit) may be configured to control the base station to perform an operation procedure about the network device in the foregoing method embodiments.

In an example, the BBU 102 may include one or more boards, and a plurality of boards may jointly support a radio access network (such as an LTE network) having a single access standard, or may respectively support radio access networks (such as an LTE network, a 5G network, and another network) having different radio access networks. The BBU 102 further includes a memory 1021 and a processor 1022. The memory 1021 is configured to store a necessary instruction and necessary data. The processor 1022 is configured to control the base station to perform a necessary action, for example, configured to control the base station to perform the operation procedure about the network device in the foregoing method embodiments. The memory 1021 and the processor 1022 may serve one or more boards. In other words, the memory and the processor may be disposed individually on each board. Alternatively, a plurality of boards may share the same memory and the same processor. In addition, a necessary circuit may be further disposed on each board.

It should be understood that the network device 1000 shown in FIG. 10 can implement each process related to the network device in the method embodiment of FIG. 4 or FIG. 4. Operations and/or functions of the modules in the network device 1000 are respectively for implementing corresponding procedures in the foregoing method embodiments. For details, refer to the descriptions in the method embodiments. To avoid repetition, details are properly omitted herein.

An embodiment of this application further provides a processing apparatus, including a processor and an interface. The processor is configured to perform the communication method in any one of the foregoing method embodiments.

It should be understood that, the processing apparatus may be a chip. For example, the processing apparatus may be a field-programmable gate array (FPGA), or may be an application-specific integrated circuit (ASIC), or may be a system on chip (SoC), or may be a central processing unit (CPU), or may be a network processor (NP), or may be a digital signal processor (DSP), or may be a micro control unit (MCU), or may be a programmable logic device (PLD) or another integrated chip.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It should be noted that the processor in this embodiment of the present invention may be an integrated circuit chip and is capable of signal processing. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logical device, a discrete gate or transistor logic device, or a discrete hardware component. It may implement or perform the methods, the steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

An embodiment of this application further provides a communications system, and the communications system includes the network device and the terminal device in the foregoing.

An embodiment of this application further provides a computer readable medium. The computer readable medium stores a computer program, and when being executed by a computer, the computer program implements the communication method in any one of the foregoing method embodiments.

An embodiment of this application further provides a computer program product. When being executed by a computer, the computer program product implements the communication method in any one of the foregoing method embodiments.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid-state drive (SSD)), or the like.

It should be understood that, the foregoing describes a communication method during downlink transmission in a communications system, but this application is not limited thereto. Optionally, during uplink transmission, a solution similar to that in the foregoing may alternatively be used. To avoid repetition, details are not described herein again.

It should be understood that "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be further understood that, first, second, third, fourth, and various numeric numbers are only for differentiation performed for ease of description, but are not used for limiting the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that, in combination with illustrative logical blocks described in the embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer program instructions. When the computer program instructions (programs) are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    determining a power boost value for transmitting or receiving a demodulation reference signal (DMRS), wherein the power boost value satisfies at least one of:
        the power boost value is 0 dB when an uplink scheduling command associated with the DMRS is downlink control information (DCI) with a DCI format other than 0_1, an uplink transmission waveform is cyclic prefix-orthogonal frequency division multiplexing (CP-OFDM), and a quantity of symbols occupied in uplink transmission is less than or equal to 2;
        the power boost value is 0 dB when a radio resource control (RRC) connection is not established, an uplink transmission waveform is CP-OFDM, and a quantity of symbols occupied in the uplink transmission is less than or equal to 2; or
        the power boost value is 0 dB when an uplink scheduling command associated with the DMRS is DCI, cyclic redundancy check (CRC) of the DCI is scrambled by using a temporary configure radio network temporary identity (TC-RNTI), an uplink transmission waveform is CP-OFDM, and a quantity of symbols occupied in the uplink transmission is less than or equal to 2.

2. The method according to claim 1, wherein the DCI format other than 0_1 is 0_0.

3. The method according to claim 1, wherein the power boost value is a relative value relative to a power of a physical uplink shared channel (PUSCH).

4. A method, comprising:
determining a power boost value for transmitting or receiving a demodulation reference signal (DMRS), wherein the power boost value satisfies at least one of:
the power boost value is X dB when an uplink scheduling command associated with the DMRS is downlink control information (DCI) with a DCI format other than 0_1, an uplink transmission waveform is cyclic prefix-orthogonal frequency division multiplexing (CP-OFDM), and a quantity of symbols occupied in the uplink transmission is greater than 2;
the power boost value is X dB when a radio resource control (RRC) connection is not established, an uplink transmission waveform is CP-OFDM, and a quantity of symbols occupied in the uplink transmission is greater than 2; or
the power boost value is X dB when the uplink scheduling command associated with the DMRS is DCI, cyclic redundancy check (CRC) of the DCI is scrambled by using a temporary configure radio network temporary identity (TC-RNTI), an uplink transmission waveform is CP-OFDM, and a quantity of symbols occupied in the uplink transmission is greater than 2; and
wherein X is greater than 0.

5. The method according to claim 4, wherein the DCI format other than 0_1 is 0_0.

6. The method according to claim 4, wherein X=3.

7. The method according to claim 4, wherein the power boost value is a relative value relative to a power of a physical uplink shared channel (PUSCH).

8. A method, comprising:
determining a power boost value for transmitting or receiving a demodulation reference signal (DMRS), wherein the power boost value satisfies at least one of:
the power boost value is X dB when an uplink scheduling command associated with the DMRS is downlink control information (DCI) with a DCI format other than 0_1, and an uplink transmission waveform is discrete Fourier transform-spread spectrum orthogonal frequency division multiplexing multiple access (DFT-s-OFDM);
the power boost value is X dB when a radio resource control (RRC) connection is not established and an uplink transmission waveform is DFT-s-OFDM; or
the power boost value is X dB when an uplink scheduling command associated with the DMRS is DCI, cyclic redundancy check (CRC) of the DCI is scrambled by using a temporary configure radio network temporary identity (TC-RNTI), and the uplink transmission waveform is DFT-s-OFDM; and
wherein X is greater than 0.

9. The method according to claim 8, wherein the DCI format other than 0_1 is 0_0.

10. The method according to claim 8, wherein X=3.

11. The method according to claim 8, wherein the power boost value is a relative value relative to a power of a physical uplink shared channel (PUSCH).

12. An apparatus, comprising:
at least one processor, and
one or more memories coupled to the at least one processor and storing programming instructions for execution by the at least one processor to perform operations comprising:
determining a power boost value for transmitting or receiving a demodulation reference signal (DMRS), wherein the power boost value satisfies at least one of:
the power boost value is 0 dB when an uplink scheduling command associated with the DMRS is downlink control information (DCI) with a DCI format other than 0_1, an uplink transmission waveform is cyclic prefix-orthogonal frequency division multiplexing (CP-OFDM), and a quantity of symbols occupied in uplink transmission is less than or equal to 2;
the power boost value is 0 dB when a radio resource control (RRC) connection is not established, an uplink transmission waveform is CP-OFDM, and a quantity of symbols occupied in the uplink transmission is less than or equal to 2; or
the power boost value is 0 dB when an uplink scheduling command associated with the DMRS is DCI, cyclic redundancy check (CRC) of the DCI is scrambled by using a temporary configure radio network temporary identity (TC-RNTI), an uplink transmission waveform is CP-OFDM, and a quantity of symbols occupied in the uplink transmission is less than or equal to 2.

13. The apparatus according to claim 12, wherein the DCI format other than 0_1 is 0_0.

14. The apparatus according to claim 12, wherein the power boost value is a relative value relative to a power of a physical uplink shared channel (PUSCH).

15. The apparatus according to claim 12, wherein the apparatus is a terminal device, a network device or a chip.

16. An apparatus, comprising:
at least one processor, and
one or more memories coupled to the at least one processor and storing programming instructions for execution by the at least one processor to perform operations comprising:
determining a power boost value for transmitting or receiving a demodulation reference signal (DMRS), wherein the power boost value satisfies at least one of:
the power boost value is X dB when an uplink scheduling command associated with the DMRS is downlink control information (DCI) with a DCI format other than 0_1, an uplink transmission waveform is cyclic prefix-orthogonal frequency division multiplexing (CP-OFDM), and a quantity of symbols occupied in the uplink transmission is greater than 2;
the power boost value is X dB when a radio resource control (RRC) connection is not established, an uplink transmission waveform is CP-OFDM, and a quantity of symbols occupied in the uplink transmission is greater than 2; or
the power boost value is X dB when the uplink scheduling command associated with the DMRS is DCI, cyclic redundancy check (CRC) of the DCI is scrambled by using a temporary configure radio network temporary identity (TC-RNTI), an uplink transmission waveform is CP-OFDM, and a quantity of symbols occupied in the uplink transmission is greater than 2; and
wherein X is greater than 0.

17. The apparatus according to claim 16, wherein the DCI format other than 0_1 is 0_0.

18. The apparatus according to claim 16, wherein X=3.

19. The apparatus according to claim 16, wherein the power boost value is a relative value relative to a power of a physical uplink shared channel (PUSCH).

20. The apparatus according to claim 16, wherein the apparatus is a terminal device, a network device or a chip.

21. An apparatus, comprising:
at least one processor, and
one or more memories coupled to the at least one processor and storing programming instructions for execution by the at least one processor to perform operations comprising:
determining a power boost value for transmitting or receiving a demodulation reference signal (DMRS), wherein the power boost value satisfies at least one of:
the power boost value is X dB when an uplink scheduling command associated with the DMRS is downlink control information (DCI) with a DCI format other than 0_1, and an uplink transmission waveform is discrete Fourier transform-spread spectrum orthogonal frequency division multiplexing multiple access (DFT-s-OFDM);
the power boost value is X dB when a radio resource control (RRC) connection is not established and an uplink transmission waveform is DFT-s-OFDM; or
the power boost value is X dB when an uplink scheduling command associated with the DMRS is DCI, cyclic redundancy check (CRC) of the DCI is scrambled by using a temporary configure radio network temporary identity (TC-RNTI), and the uplink transmission waveform is DFT-s-OFDM; and
wherein X is greater than 0.

22. The apparatus according to claim 21, wherein the DCI format other than 0_1 is 0_0.

23. The apparatus according to claim 21, wherein X=3.

24. The apparatus according to claim 21, wherein the power boost value is a relative value relative to a power of a physical uplink shared channel (PUSCH).

25. The apparatus according to claim 21, wherein the apparatus is a terminal device, a network device or a chip.

26. A non-transitory computer-readable storage medium comprising programming instructions for execution by at least one processor to perform operations comprising:
determining a power boost value for transmitting or receiving a demodulation reference signal (DMRS), wherein the power boost value satisfies at least one of:
the power boost value is 0 dB when an uplink scheduling command associated with the DMRS is downlink control information (DCI) with a DCI format other than 0_1, an uplink transmission waveform is cyclic prefix-orthogonal frequency division multiplexing (CP-OFDM), and a quantity of symbols occupied in uplink transmission is less than or equal to 2;
the power boost value is 0 dB when a radio resource control (RRC) connection is not established, an uplink transmission waveform is CP-OFDM, and a quantity of symbols occupied in the uplink transmission is less than or equal to 2; or
the power boost value is 0 dB when an uplink scheduling command associated with the DMRS is DCI, cyclic redundancy check (CRC) of the DCI is scrambled by using a temporary configure radio network temporary identity (TC-RNTI), an uplink transmission waveform is CP-OFDM, and a quantity of symbols occupied in the uplink transmission is less than or equal to 2.

27. The non-transitory computer-readable storage medium according to claim 26, wherein the DCI format other than 0_1 is 0_0.

28. The non-transitory computer-readable storage medium according to claim 26, wherein the power boost value is a relative value relative to a power of a physical uplink shared channel (PUSCH).

29. A non-transitory computer-readable storage medium comprising programming instructions for execution by at least one processor to perform operations comprising:
determining a power boost value for transmitting or receiving a demodulation reference signal (DMRS), wherein the power boost value satisfies at least one of:
the power boost value is X dB when an uplink scheduling command associated with the DMRS is downlink control information (DCI) with a DCI format other than 0_1, an uplink transmission waveform is cyclic prefix-orthogonal frequency division multiplexing (CP-OFDM), and a quantity of symbols occupied in the uplink transmission is greater than 2;
the power boost value is X dB when a radio resource control (RRC) connection is not established, an uplink transmission waveform is CP-OFDM, and a quantity of symbols occupied in the uplink transmission is greater than 2;
the power boost value is X dB when the uplink scheduling command associated with the DMRS is DCI, cyclic redundancy check (CRC) of the DCI is scrambled by using a temporary configure radio network temporary identity (TC-RNTI), an uplink transmission waveform is CP-OFDM, and a quantity of symbols occupied in the uplink transmission is greater than 2;
the power boost value is X dB when an uplink scheduling command associated with the DMRS is DCI whose format is a first format and an uplink transmission waveform is discrete Fourier transform-spread spectrum orthogonal frequency division multiplexing multiple access (DFT-s-OFDM);
the power boost value is X dB when a RRC connection is not established and an uplink transmission waveform is DFT-s-OFDM; or
the power boost value is X dB when an uplink scheduling command associated with the DMRS is DCI, CRC of the DCI is scrambled by using TC-RNTI, and the uplink transmission waveform is DFT-s-OFDM; and
wherein X is greater than 0.

30. The non-transitory computer-readable storage medium according to claim 29, wherein the DCI format other than 0_1 is 0_0.

31. The non-transitory computer-readable storage medium according to claim 29, wherein X=3.

32. The non-transitory computer-readable storage medium according to claim 29, wherein the power boost value is a relative value relative to a power of a physical uplink shared channel (PUSCH).

* * * * *